(12) United States Patent
Han et al.

(10) Patent No.: US 12,360,648 B2
(45) Date of Patent: Jul. 15, 2025

(54) ELECTRONIC DEVICE COMPRISING FLEXIBLE DISPLAY, AND METHOD FOR OPERATING SAME

(71) Applicant: Samsung Electronics Co., Ltd., Suwon-si (KR)

(72) Inventors: Jonghyun Han, Suwon-si (KR); Bohyeon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/315,136

(22) Filed: May 10, 2023

(65) Prior Publication Data

US 2023/0280874 A1    Sep. 7, 2023

Related U.S. Application Data

(63) Continuation of application No. PCT/KR2021/015607, filed on Nov. 1, 2021.

(30) Foreign Application Priority Data

Nov. 11, 2020   (KR) .................. 10-2020-0149902

(51) Int. Cl.
*G06F 3/0481* (2022.01)
*G06F 1/16* (2006.01)
(Continued)

(52) U.S. Cl.
CPC .......... *G06F 3/0481* (2013.01); *G06F 1/1624* (2013.01); *G06F 1/1652* (2013.01);
(Continued)

(58) Field of Classification Search
CPC .... G06F 3/0481; G06F 1/1624; G06F 1/1652; G06F 3/0486; G06F 3/04886; G06F 2203/04803; H04M 1/0237; H04M 1/0268
See application file for complete search history.

(56) References Cited

U.S. PATENT DOCUMENTS

2013/0265262 A1   10/2013   Jung et al.
2013/0321340 A1   12/2013   Seo et al.
(Continued)

FOREIGN PATENT DOCUMENTS

EP          2 881 840 A2      6/2015
KR    10-2012-0092036 A      8/2012
(Continued)

OTHER PUBLICATIONS

International Search Report and written opinion dated Feb. 11, 2022, issued in International Application No. PCT/KR2021/015607.

(Continued)

*Primary Examiner* — Stephen S Hong
*Assistant Examiner* — Darrin Hope
(74) *Attorney, Agent, or Firm* — Jefferson IP Law, LLP

(57) ABSTRACT

An electronic device comprising a flexible display is provided. The electronic device includes a housing, the flexible display exposed to the outside through the housing and slidable through the housing, a plurality of sensors including a first sensor of which the position is changed according to sliding of the flexible display, a second sensor of which the position is not changed regardless of the sliding of the flexible display, and a processor disposed in the housing and being configured to, when a first function using the first sensor is executed, display a first screen for the first function on a first region of the flexible display, based on the sliding (Continued)

of the flexible display, identify the position of the first sensor, and display the first screen on a second region corresponding to the position of the first sensor.

20 Claims, 27 Drawing Sheets

(51) Int. Cl.
*G06F 3/0486* (2013.01)
*G06F 3/04886* (2022.01)
*H04M 1/02* (2006.01)

(52) U.S. Cl.
CPC ........ *G06F 3/0486* (2013.01); *G06F 3/04886* (2013.01); *H04M 1/0237* (2013.01); *H04M 1/0268* (2013.01); *G06F 2203/04803* (2013.01)

(56) References Cited

U.S. PATENT DOCUMENTS

| | | | |
|---|---|---|---|
| 2014/0029017 A1 | 1/2014 | Lee et al. | |
| 2014/0380186 A1 | 12/2014 | Kim et al. | |
| 2015/0220218 A1 | 8/2015 | Jeon et al. | |
| 2015/0234507 A1 | 8/2015 | Chun et al. | |
| 2016/0026381 A1 | 1/2016 | Kim et al. | |
| 2016/0299578 A1* | 10/2016 | Kim | G06F 1/1694 |
| 2016/0349971 A1* | 12/2016 | Chi | G09G 5/373 |
| 2017/0003864 A1 | 1/2017 | Yoshinaka | |
| 2019/0261519 A1 | 8/2019 | Park et al. | |
| 2019/0317550 A1 | 10/2019 | Kim et al. | |
| 2019/0384438 A1 | 12/2019 | Park et al. | |

FOREIGN PATENT DOCUMENTS

| | | |
|---|---|---|
| KR | 10-2012-0128833 A | 11/2012 |
| KR | 10-2013-0113898 A | 10/2013 |
| KR | 10-2015-0009043 A | 1/2015 |
| KR | 10-2015-0096952 A | 8/2015 |
| KR | 10-1581275 B1 | 12/2015 |
| KR | 10-2016-0012779 A | 2/2016 |
| KR | 10-2019-0101184 A | 8/2019 |
| KR | 10-2019-0119719 A | 10/2019 |
| KR | 10-2019-0141518 A | 12/2019 |
| KR | 10-2066716 B1 | 1/2020 |
| KR | 10-2115361 B1 | 5/2020 |

OTHER PUBLICATIONS

Extended European Search report dated Apr. 22, 2024, issued in European Application No. 21892210.2-1207.

* cited by examiner

|  | FIRST TYPE (TABLE) | SECOND TYPE (DRAWER) | THIRD TYPE (α SCREEN) |
|---|---|---|---|
| FRONT CAMERA | MOVABLE | MOVABLE | FIXED |
| REAR CAMERA | MOVABLE | MOVABLE | FIXED |
| MICROPHONE | MOVABLE | MOVABLE | FIXED |
| SPEAKER | MOVABLE | MOVABLE | FIXED |
| FINGERPRINT SENSOR | MOVABLE (FRONT-MOUNTED) | MOVABLE (FRONT-MOUNTED) | FIXED (FRONT-MOUNTED) |
| | FIXED (SIDE-MOUNTED) | MOVABLE (SIDE-MOUNTED) | FIXED (SIDE-MOUNTED) |
| NFC | FIXED | MOVABLE | FIXED |
| IRIS SENSOR | MOVABLE | MOVABLE | FIXED |

FIG. 7

| TYPE OF SENSOR | RELATED APPLICATION |
|---|---|
| FRONT CAMERA | VIDEO CALL, CAMERA |
| REAR CAMERA | CAMERA |
| MICROPHONE | VIDEO CALL, VIDEO SHOOTING, VOICE RECORDING |
| SPEAKER | VIDEO CALL, VOICE RECORDING, VIDEO SHOOTING |
| FINGERPRINT SENSOR, IRIS SENSOR | PAYMENT FUNCTION, UNLOCK FUNCTION, BANKING SERVICE |
| NFC | PAYMENT FUNCTION |

ELECTRONIC DEVICE COMPRISING FLEXIBLE DISPLAY, AND METHOD FOR OPERATING SAME

CROSS-REFERENCE TO RELATED APPLICATION(S)

This application is a continuation application, claiming priority under § 365(c), of an International Application No. PCT/KR2021/015607, filed on Nov. 1, 2021, which is based on and claims the benefit of a Korean patent application number 10-2020-0149902, filed on Nov. 11, 2020, in the Korean Intellectual Property Office, the disclosure of which is incorporated by reference herein in its entirety.

BACKGROUND

1. Field

The disclosure relates to an electronic device including a flexible display and a method for operating the same.

2. Description of Related Art

More and more services and additional functions are being provided through electronic devices, e.g., smartphones, or other portable electronic devices. To meet the needs of various users and raise use efficiency of electronic devices, communication service carriers or device manufacturers are jumping into competitions to develop electronic devices with differentiated and diversified functionalities. Accordingly, various functions that are provided through electronic devices are evolving more and more.

As the demand for mobile communication increases, and the degree of integration of electronic devices increases, the portability of electronic devices such as smartphones may be increased, and better convenience may be provided in use of multimedia functions. Use of an electronic device with a larger screen may give more convenience to the user in web browsing or multimedia playing. A larger display may be adopted to output a larger screen. However, this way may be limited by the portability of the electronic device. For example, a display using organic light emitting diodes may secure the portability of the electronic device while providing a larger screen. A display using, or equipped with, organic light emitting diodes may implement a stable operation even if it is made quite thin, so that the display may be applied to an electronic device in a foldable, bendable or rollable form.

The above information is presented as background information only to assist with an understanding of the disclosure. No determination has been made, and no assertion is made, as to whether any of the above might be applicable as prior art with regard to the disclosure.

SUMMARY

An electronic device may display various contents, such as, e.g., application execution screens or icons, through the display. In an electronic device including a flexible display, the position of the displayed content may be changed as, e.g., a structure forming the electronic device is moved to change the screen between an opened and closed state. Further, as the structure forming the electronic device is moved and the screen is changed to an opened or closed state, the position of some hardware (e.g., a physical sensor) included in the structure may also be changed. However, some hardware (e.g., a physical sensor) included in the structure of the electronic device may have a fixed position regardless of the movement of the structure.

Conventional flexible display-equipped electronic devices do not consider whether the position of hardware (e.g., a physical sensor) related to content displayed is changed or fixed in position when the position of the content is changed according to movement of the structure. For example, when the position of display of the content is changed by the movement of the structure in displaying content using a specific sensor which has a fixed position, the interaction line between the content and the specific sensor may become complicated or distant.

Aspects of the disclosure are to address at least the above-mentioned problems and/or disadvantages and to provide at least the advantages described below. Accordingly, an aspect of the disclosure is to provide an electronic device and method for operating the same, which may display content in a position optimized for interaction line to the user considering the position of a physical sensor when the screen of the flexible display is extended or shrunken.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a flexible display at least partially exposed to an outside through the housing and slidable through the housing, a plurality of sensors including at least one first sensor whose position is changed according to a slide of the flexible display and at least one second sensor whose position is not changed regardless of the slide of the flexible display, and a processor disposed in the housing and configured to, in response to performing a first function using the at least one first sensor, display a first screen for the first function in a first area of the flexible display, identify a position of the at least one first sensor based on the slide of the flexible display, and display the first screen in a second area corresponding to the position of the at least one first sensor.

In accordance with another aspect of the disclosure, a method for operating an electronic device including a flexible display is provided. The method includes, in response to performing a first function using at least one first sensor, displaying a first screen for the first function in a first area of a slidable flexible display included in the electronic device, identifying a slide of the flexible display, identifying a position of the at least one first sensor based on the slide of the flexible display, and displaying the first screen in a second area corresponding to the position of the at least one first sensor among a plurality of sensors included in the electronic device. The plurality of sensors include the at least one first sensor whose position is changed according to the slide of the flexible display and at least one second sensor whose position is not changed regardless of the slide of the flexible display.

According to various embodiments, a computer-readable non-volatile recording medium may store instructions which, when executed by a processor of an electronic device, allow the processor to, in response to performing a first function using the at least one first sensor, display a first screen for the first function in a first area of a slidable flexible display included in the electronic device, identify a slide of the flexible display, identify a position of the at least one first sensor based on the slide of the flexible display, and display the first screen in a second area corresponding to the position of the at least one first sensor among a plurality of sensors included in the electronic device. The plurality of sensors include the at least one first sensor whose position is changed according to the slide of the flexible display and at least one second sensor whose position is not changed regardless of the slide of the flexible display.

According to various embodiments, the electronic device including a flexible display may display content in a position optimized for the interaction line to the user considering the position of a physical sensor although the screen is extended or shrunken as the structure moves.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a table illustrating three types of electronic devices having a flexible display according to an embodiment of the disclosure;

Throughout the drawings, it should be noted that like reference numbers are used to depict the same or similar elements, features, and structures.

DETAILED DESCRIPTION

Figure 1:
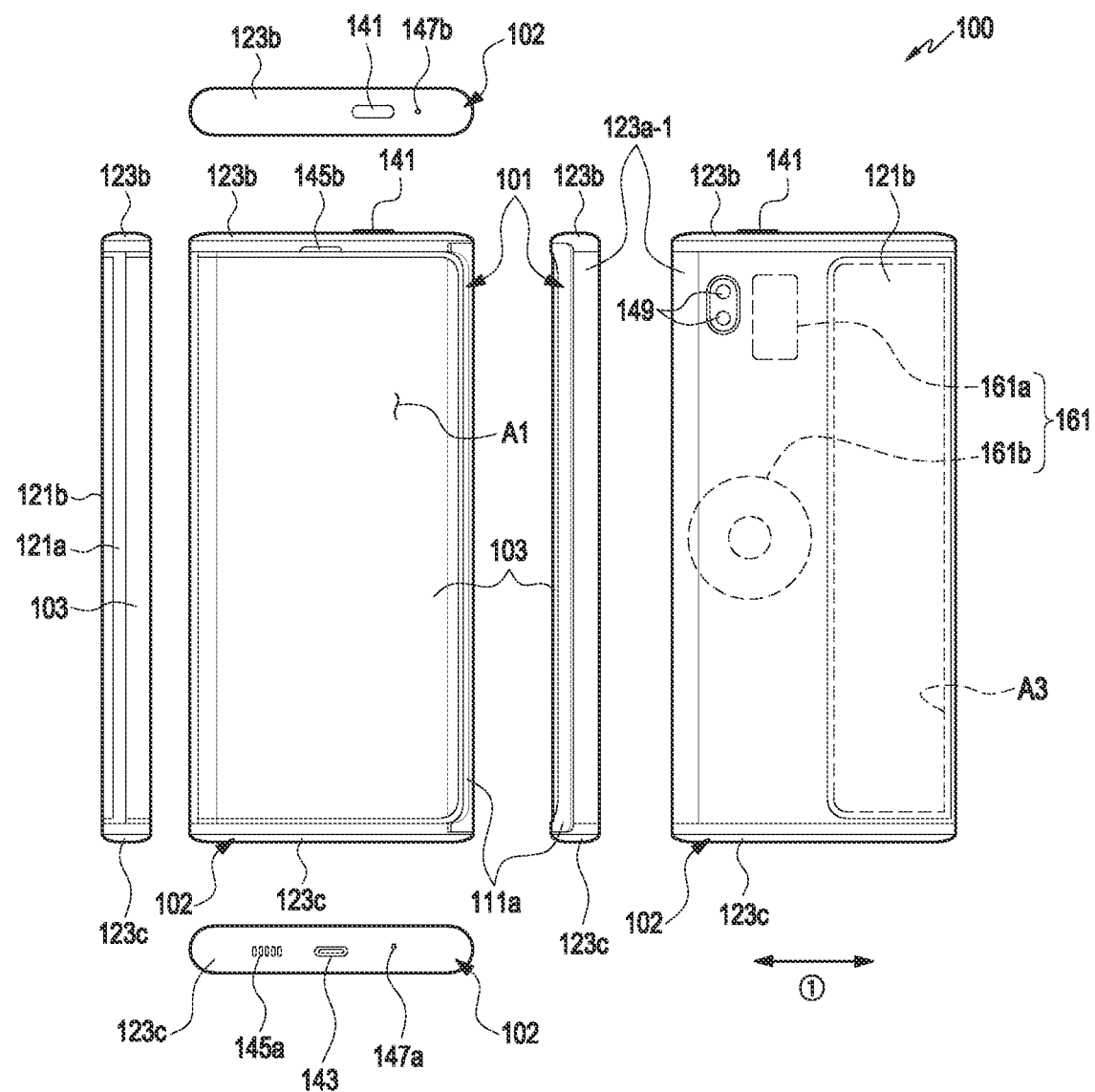
FIG. 1 is a view illustrating an electronic device, wherein a portion of a flexible display is received in a second structure according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
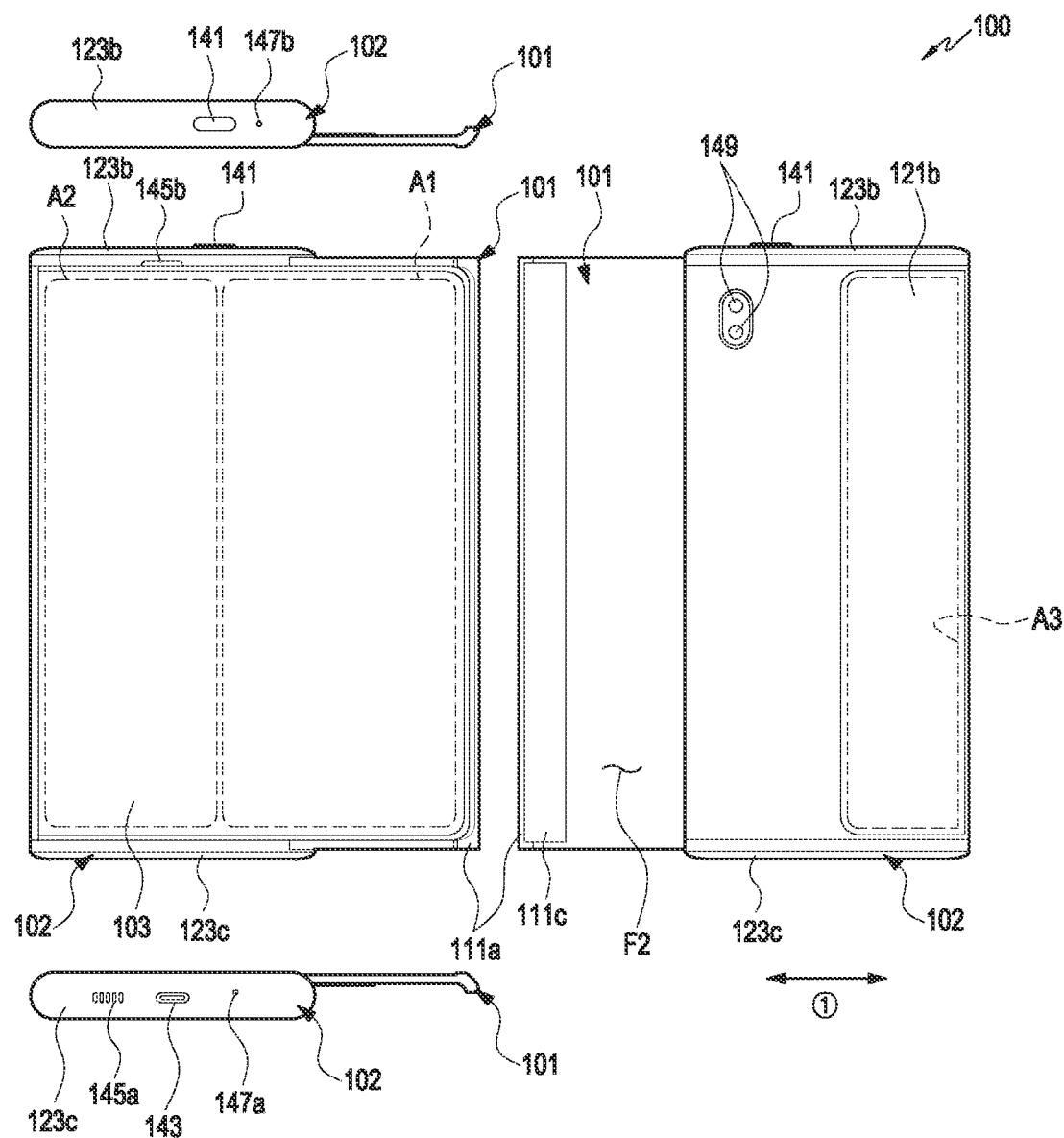
FIG. 2 is a view illustrating an electronic device, wherein most of a flexible display is exposed to the outside of a second structure according to an embodiment of the disclosure.

FIG. 1 is a view illustrating an electronic device, wherein a portion (e.g., a second area A2) of a flexible display is received in a second structure according to an embodiment of the disclosure. FIG. 2 is a view illustrating an electronic device, wherein most of a flexible display is exposed to the outside of a second structure according to an embodiment of the disclosure.

The state shown in FIG. 1 may be defined as a first structure 101 being closed with respect to a second structure 102, and the state shown in FIG. 2 may be defined as the first structure 101 being open with respect to the second structure 102. According to an embodiment, the "closed state" or "opened state" may be defined as a closed or open state of the electronic device. An electronic device 100 may include the first structure 101 and the second structure 102 movably disposed in the first structure 101. According to an embodiment, the electronic device 100 may be interpreted as having a structure in which the first structure 101 is slidably disposed on the second structure 102. According to an embodiment, the first structure 101 may be disposed to perform reciprocating motion between the closed state and the opened state in the shown direction with respect to the second structure 102, for example, a direction indicated by an arrow ①.

Referring to FIG. 1, the first structure 101 may include a first plate 111a (e.g., a slide plate) and may include a first surface F1 (refer to FIG. 3) formed with at least a portion of the first plate 111a and a second surface F2 facing in a direction opposite to the first surface F1. According to an embodiment, the second structure 102 may include a second plate 121a (see FIG. 3) (e.g., a rear case), a first sidewall 123a extending from the second plate 121a, a second sidewall 123b extending from the first sidewall 123a and the second plate 121a, a third sidewall 123c extending from the first sidewall 123a and the second plate 121a and parallel to the second sidewall 123b, and/or a rear plate 121b (e.g., a rear window). According to an embodiment, the second sidewall 123b and the third sidewall 123c may be formed to be perpendicular to the first sidewall 123a. According to an embodiment, the second plate 121a, the first sidewall 123a, the second sidewall 123b, and the third sidewall 123c may be formed to have an opening (e.g., in the front face) to receive (or surround) at least a portion of the first structure 101. For example, the first structure 101 may be coupled to the second structure 102 in a state in which it is at least partially surrounded, and the first structure 101 may be slide in a direction parallel to the first surface F1 or the second surface F2, for example, direction ① indicated with the arrow.

According to an embodiment, the second sidewall 123b or the third sidewall 123c may be omitted. According to an embodiment, the second plate 121a, the first sidewall 123a, the second sidewall 123b, and/or the third sidewall 123c may be formed as separate structures and may be combined or assembled. The rear plate 121b may be coupled to surround at least a portion of the second plate 121a. In some embodiments, the rear plate 121b may be formed substantially integrally with the second plate 121a. According to an embodiment, the second plate 121a or the rear plate 121b may cover at least a portion of a flexible display 103. For example, the flexible display 103 may be at least partially received inside the second structure 102, and the second plate 121a or the rear plate 121b may cover a portion (e.g., the second area A2) of the flexible display 103 received inside the second structure 102.

According to various embodiments, the first structure 101 may be moved in an open state or closed state with respect to the second structure 102 in a first direction (e.g., direction ①) parallel with the second plate 121a (e.g., the rear case) and the second sidewall 123b to be positioned a first distance away from the first sidewall 123a in the closed state and be positioned a second distance away from the first sidewall 123a in the open state, wherein the second distance is larger than the first distance. In some embodiments, when in the closed state, the first structure 101 may be positioned to surround a portion of the first sidewall 123a.

According to various embodiments, the electronic device 100 may include a display (e.g., flexible display 103), a key input device 141, a connector hole 143, audio modules 145a, 145b, 147a, and 147b, or a camera module 149. Although not shown, the electronic device 100 may further include an indicator (e.g., a light emitting diode (LED) device) or various sensor modules.

According to various embodiments, the display 103 may include a first area A1 and a second area A2. In an embodiment, the first area A1 may extend substantially across at least a portion of the first surface F1 and may be disposed on the first surface F1. The second area A2 may extend from the first area A1 and be inserted or received into, or exposed to the outside of, the second structure 102 (e.g., the housing) according to the slide of the first structure 101. As will be described below, the second area A2 may be moved while being substantially guided by a roller 151 (refer to FIG. 3) mounted on the second structure 102 and may thus be received into the inside of or exposed to the outside of the second structure 102. For example, while the first structure 101 slides, a portion of the second area A2 may be deformed into a curved shape in a position corresponding to the roller 151.

According to various embodiments, when viewed from the top of the first plate 111a (e.g., slide plate), when the first structure 101 moves from the closed state to the opened state, the second area A2 may be gradually exposed to the outside of the second structure 102 to be substantially coplanar with the first area A1. The display 103 may be disposed to be coupled with, or adjacent, a touch detecting circuit, a pressure sensor capable of measuring the strength (pressure) of touches, and/or a digitizer for detecting a magnetic field-type stylus pen. In an embodiment, the second area A2 may be at least partially received inside the second structure 102, and a portion of the second area A2 may be exposed to the outside even in the state shown in FIG. 1 (e.g., the closed state). In some embodiments, irrespective of the closed state or the opened state, the exposed portion of the second area A2 may be positioned on the roller 151 and, in a position corresponding to the roller 151, a portion of the second area A2 may maintain the curved shape.

The key input device 141 may be disposed on the second sidewall 123b or the third sidewall 123c of the second structure 102. Considering the appearance and the state of use, the electronic device 100 may be manufactured to omit the illustrated key input device 141 or to include additional key input device(s). According to an embodiment, the electronic device 100 may include a key input device (not shown), e.g., a home key button or a touchpad disposed around the home key button. According to another embodiment, at least a portion of the key input device 141 may be positioned on an area of the first structure 101.

According to various embodiments, the connector hole 143 may be omitted or may receive a connector (e.g., a universal serial bus (USB) connector) for transmitting and receiving power and/or data with an external electronic device. Although not shown, the electronic device 100 may include a plurality of connector holes 143, and some of the plurality of connector holes 143 may function as connector holes for transmitting/receiving audio signals with an external electronic device. It should be noted that in the illustrated embodiment, the connector hole 143 is disposed in the third sidewall 123c, but the disclosure is not limited thereto. For example, the connector hole 143 or an additional connector hole not shown may be disposed in the first sidewall 123a or the second sidewall 123b.

According to various embodiments, the audio modules 145a, 145b, 147a, and 147b may include speaker holes 145a and 145b or microphone holes 147a and 147b. One of the speaker holes 145a and 145b may be provided as a receiver hole for voice calls, and the other may be provided as an external speaker hole. The microphone holes 147a and 147b may have a microphone inside to obtain external sounds. According to an embodiment, there may be a plurality of microphones to be able to detect the direction of a sound. In some embodiments, the speaker holes 145a and 145b and the microphone holes 147a and 147b may be implemented as one hole, or a speaker may be included without the speaker holes 145a and 145b (e.g., a piezo speaker). According to an embodiment, the speaker hole " "145b may be disposed in the first structure 101 and used as a receiver hole for voice calls, and the speaker hole " "145a (e.g., an external speaker hole) or the microphone holes 147a and 147b may be disposed in the second structure 102 (e.g., one of the sidewalls 123a, 123b, and 123c).

The camera module 149 may be provided on the second structure 102 and may capture a subject in a direction opposite to the first area A1 of the display 103. The electronic device 100 may include a plurality of camera modules 149. For example, the electronic device 100 may include a wide-angle camera, a telephoto camera, or a close-up camera, and according to an embodiment, by including an infrared projector and/or an infrared receiver, the electronic device 100 may measure the distance to the subject. The camera module 149 may include one or more lenses, an image sensor, and/or an image signal processor. Although not shown, the electronic device 100 may further include a camera module (e.g., a front camera) that captures the subject in the same direction as the first area A1 of the display 103. For example, the front camera may be disposed around the first area A1 or in an area overlapping the display 103 and, when disposed in the area overlapping the display 103, the front camera may capture the subject via the display 103.

According to various embodiments, an indicator (not shown) of the electronic device 100 may be disposed on the first structure 101 or the second structure 102, and the indicator may include a light emitting diode to provide state information about the electronic device 100 as a visual signal. The sensor module (not shown) of the electronic device 100 may produce an electrical signal or data value corresponding to the internal operation state or external environment state of the electronic device. The sensor module may include, for example, a proximity sensor, a fingerprint sensor, or a biometric sensor (e.g., an iris/face recognition sensor or a heartrate monitor (HRM) sensor). According to another embodiment, the sensor module may further include, e.g., at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

Figure 3:
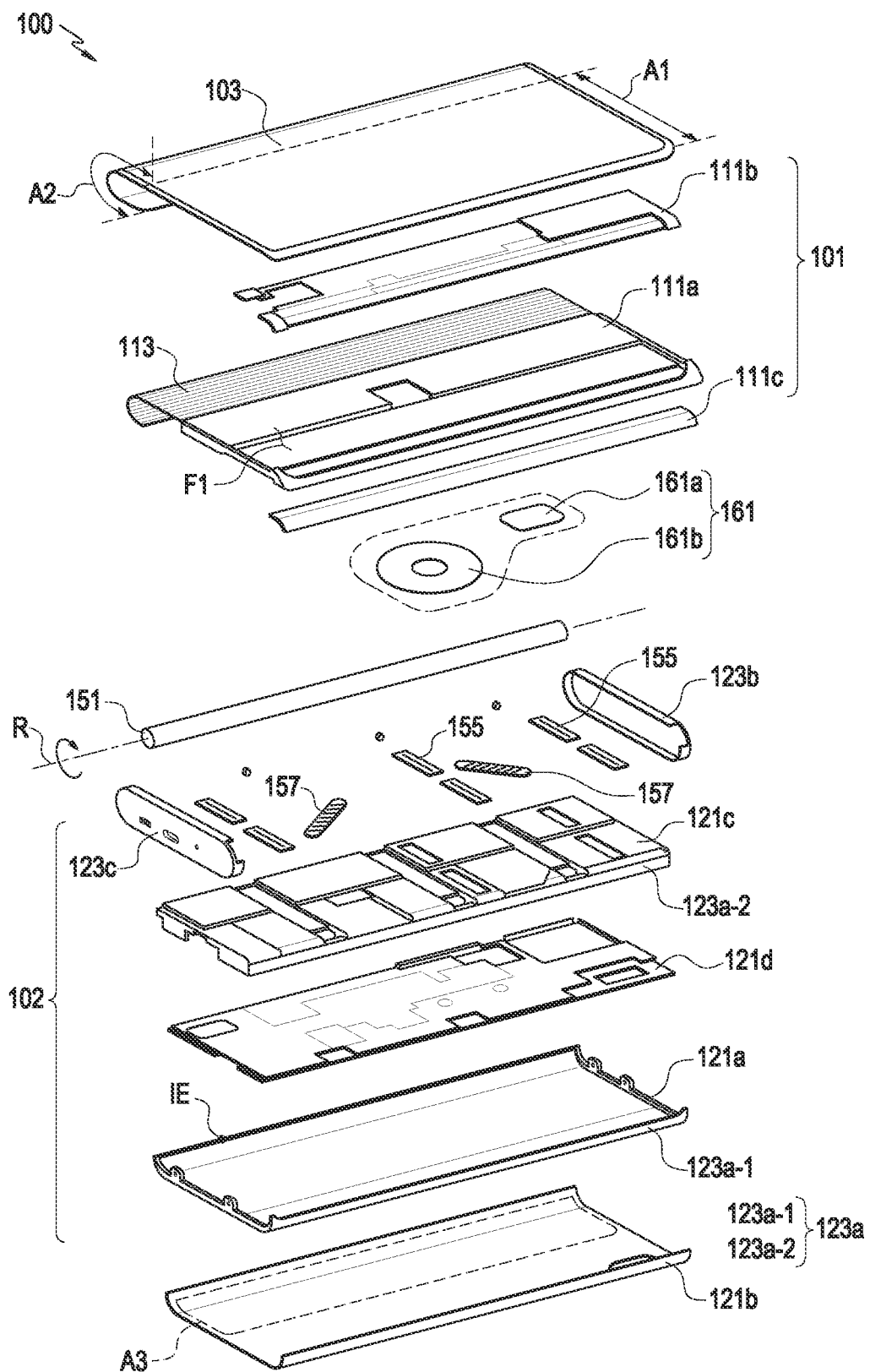
FIG. 3 is an exploded perspective view illustrating an electronic device according to an embodiment of the disclosure.
Figure 4:
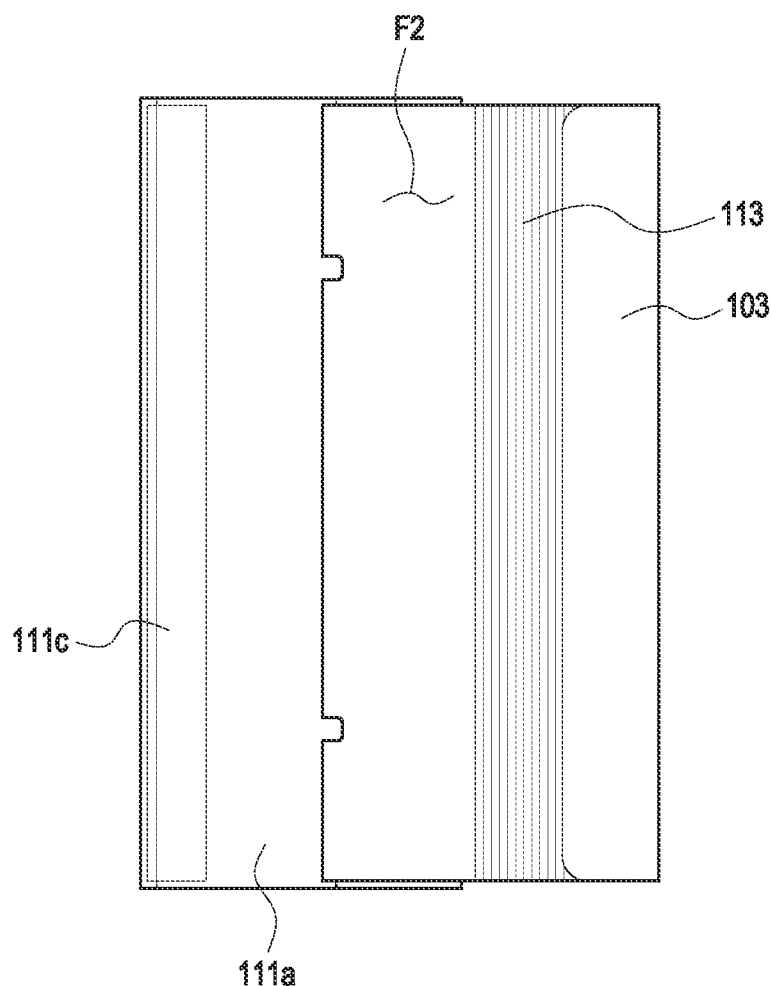
FIG. 4 is a bottom view illustrating an example in which a flexible display of an electronic device is mounted, according to an embodiment of the disclosure.

FIG. 3 is an exploded perspective view illustrating an electronic device (e.g., an electronic device of FIG. 1 or FIG. 2) according to an embodiment of the disclosure. FIG. 4 is a bottom view illustrating a state in which a flexible display 103 of an electronic device (e.g., the electronic device 100 of FIGS. 1 to 3) is mounted according to an embodiment of the disclosure.

Referring to FIGS. 3 and 4, the electronic device 100 may include a first structure 101, a second structure 102 (e.g., a housing), a display 103 (e.g., a flexible display), a guide member (e.g., the roller 151), an articulated hinge structure 113, and/or at least one antenna structure 161. A portion (e.g., the second area A2) of the display 103 may be received in the second structure 102 while being guided by the roller 151.

According to various embodiments, the first structure 101 may include a first plate 111a (e.g., a slide plate), a first bracket 111b and/or a second bracket 111c mounted on the first plate 111a. The first structure 101, for example, the first plate 111a, the first bracket 111b, and/or the second bracket 111c may be formed of a metallic material and/or a non-metallic (e.g., polymer) material. The first plate 111a may be mounted on the second structure 102 (e.g., the housing) and may be linearly reciprocated in one direction (e.g., in the direction ① indicated with the arrow in FIG. 1) while being guided by the second structure 102. In one embodiment, the first bracket 111b may be coupled to the first plate 111a to, together with the first plate 111a, form the first surface F1 of the first structure 101. The first area A1 of the display 103 may be substantially mounted on the first surface F1 and remain in a flat plate shape. The second bracket 111c may be coupled to the first plate 111a to, together with the first plate 111a, form the second surface F2 of the first structure 101. According to an embodiment, the first bracket 111b and/or the second bracket 111c may be integrally formed with the first plate 111a. This may be appropriately designed in consideration of the assembly structure or manufacturing process of the product to be manufactured. The first structure 101 or the first plate 111a may be coupled with the second structure 102 and slide with respect to the second structure 102.

According to various embodiments, the articulated hinge structure 113 may include a plurality of rods extending in a straight line and disposed parallel to a rotation axis R of the roller 151. The plurality of rods may be arranged along a direction perpendicular to the rotation axis R, e.g., along a direction in which the first structure 101 slides. In an embodiment, the articulated hinge structure 113 is connected with one end of the first structure 101 to be able to move with respect to the second structure 102 according to the slide of the first structure 101. For example, in the closed state (e.g., the state illustrated in FIG. 1), the articulated hinge structure 113 may be substantially received into the inside of the second structure 102 and, in the opened state (e.g., the state illustrated in FIG. 2), the articulated hinge structure may be extracted to the outside of the second structure 102. In some embodiments, even in the closed state, a portion of the articulated hinge structure 113 may not be received inside the second structure 102. For example, even in the closed state, a portion of the articulated hinge structure 113 may be positioned to correspond to the roller 151 outside the second structure 102.

According to various embodiments, the rods of the articulated hinge structure 113 may orbit around other adjacent rods while remaining parallel to the other adjacent rods. Thus, as the first structure 101 slides, a portion of the articulated hinge structure 113, which faces the roller 151, may form a curved surface, and another portion of the articulated hinge structure 213, which does not face the roller 151, may form a flat surface. In one embodiment, the second area A2 of the display 103 may be mounted or supported on the articulated hinge structure 113 and, in the open state (e.g., the state shown in FIG. 2), the second area A2, along with the first area A1, may be exposed to the outside of the second structure 102. In the state in which the second area A2 is exposed to the outside of the second structure 102, the articulated hinge structure 113 may substantially form a flat surface, thereby supporting or maintaining the second area A2 in the flat state.

According to various embodiments, the second structure 102 (e.g., the housing) may include a second plate 121a (e.g., the rear case), a printed circuit board (not shown), a rear plate 121b, a third plate 121c (e.g., the front case), and a support member 121d. The second plate 121a, e.g., the rear case, may be disposed to face in a direction opposite to the first surface F1 of the first plate 111a, and the second plate 121a may substantially form the external shape of the second structure 102 or the electronic device 100. In one embodiment, the second structure 102 may include a first sidewall 123a extending from the second plate 121a, a second sidewall 123b extending from the second plate 121a and formed to be substantially perpendicular to the first sidewall 123a, and a third sidewall 123c extending from the second plate 121a, substantially perpendicular to the first sidewall 123a, and parallel to the second sidewall 123b. In the illustrated embodiment, the second sidewall 123b and the third sidewall 123c are manufactured as separate components from the second plate 121a and are mounted or assembled on the second plate 121a. However, the second sidewall 123b and the third sidewall 123c may alternatively be integrally formed with the second plate 121a.

According to various embodiments, the rear plate 121b may be coupled to the outer surface of the second plate 121a and, according to an embodiment, the rear plate 121b may be manufactured integrally with the second plate 121a. In one embodiment, the second plate 121a may be formed of a metal or polymer, and the rear plate 121b may be formed of a material such as metal, glass, synthetic resin, or ceramic to decorate the exterior of the electronic device 100. According to an embodiment, the second plate 121a and/or the rear plate 121b may be formed of a material that transmits light at least partially (e.g., an auxiliary display area A3). In an embodiment, in a state in which a portion (e.g., the second area A2) of the display 103 is received into the inside of the second structure 102, at least a portion of the second area A2 may be positioned corresponding to the auxiliary display area A3. For example, in a state of being received inside the second structure 102, the display 103 may output a screen using at least a portion of the second area A2, and the user may recognize the screen output through the auxiliary display area A3.

According to various embodiments, the third plate 121c may be formed of a metal or polymer, and the third plate 121c may be coupled with the second plate 121a (e.g., rear case), the first sidewall 123a, the second sidewall 123b, and/or the third sidewall 123c to form an internal space of the second structure 102. According to an embodiment, the third plate 121c may be referred to as a "front case," and the first structure 101, e.g., the first plate 111a, may be slid while substantially facing the third plate 121c. In some embodiments, the first sidewall 123a may be formed of a combination of a first sidewall portion 123a-1 extending from the second plate 121a and a second sidewall portion 123a-2 formed at an edge of the third plate 121c. According to an embodiment, the first sidewall portion 123a-1 may be coupled to surround an edge of the third plate 121c, e.g., the second sidewall portion 123a-2. In this case, the first sidewall portion 123a-1 itself may form the first sidewall 123a.

According to various embodiments, the support member 121d may be disposed in a space between the second plate 121a and the third plate 121c, and may have a flat plate shape formed of a metal or polymer. The support member 121d may provide an electromagnetic shielding structure in the internal space of the second structure 102 or may increase mechanical rigidity of the second structure 102. In one embodiment, when received into the inside of the second structure 102, a partial area (e.g., the second area A2) of the articulated hinge structure 113 and/or the display 103 may be positioned in a space between the second plate 121a and the support member 121d.

According to various embodiments, a printed circuit board (not shown) may be disposed in a space between the third plate 121c and the support member 121d. For example, the printed circuit board may be received in a space separated by the support member 121d from the space in which a partial area of the articulated hinge structure 113 and/or the display 103 is received inside the second structure 102. A processor, memory, and/or interface may be mounted on the printed circuit board. The processor may include one or more of, e.g., a central processing unit, an application processor, a graphic processing device, an image signal processing, a sensor hub processor, or a communication processor.

The memory may include, e.g., a volatile or non-volatile memory.

The interface may include, e.g., a high definition multimedia interface (HDMI), a universal serial bus (USB) interface, a secure digital (SD) card interface, and/or an audio interface. The interface may electrically or physically connect, e.g., the electronic device 100 with an external electronic device and may include a USB connector, an SD card/multimedia card (MMC) connector, or an audio connector.

According to various embodiments, the display 103 may be an organic light emitting diode-based flexible display, and the display 103 may normally remain in the flat shape and may be at least partially deformed into a curved shape. In one embodiment, the first area A1 of the display 103 may be mounted or attached to the first surface F1 of the first structure 101 and maintained in a substantially flat shape. The second area A2 may extend from the first area A1 and may be supported or attached to the articulated hinge structure 113. For example, the second area A2 may extend along the sliding direction of the first structure 101 and, along with the articulated hinge structure, may be received in the second structure 102. As the articulated hinge structure 113 is deformed, the second area A2 may be at least partially deformed into a curved shape.

According to various embodiments, as the first structure 101 slides on the second structure 102, the area of the display 103 exposed to the outside may vary. The electronic device 100 (e.g., processor) may change the area of the display 103 that is activated based on the area of the display 103 that is exposed to the outside. For example, in the opened state or in an intermediate position between the closed state and the opened state, the electronic device 100 may activate a partial area exposed to the outside of the second structure 102 of the entire area of the display 103. In the closed state, the electronic device 100 may activate the first area A1 of the display 103 and deactivate the second area A2. In the closed state, when there is no user input for a certain period of time (e.g., 30 seconds or 2 minutes), the electronic device 100 may deactivate the entire area of the display 103. In some embodiments, in a state in which the entire area of the display 103 is inactivated, the electronic device 100 may activate a partial area of the display 103 to provide visual information, as necessary (e.g., a notification according to the user setting, a missed call/message arrival notification), through the auxiliary display area A3.

According to various embodiments, in the open state (e.g., the state shown in FIG. 2), the entire area (e.g., the first area A1 and the second area A2) of the display 103 may be substantially exposed to the outside, and the first area A1 and the second area A2 may be arranged to form a plane. In one embodiment, even in the opened state, a portion (e.g., one end) of the second area A2 may be positioned corresponding to the roller 151, and the portion of the second area A2, which corresponds to the roller 151 may remain in the curved shape. For example, according to various embodiments of the disclosure, despite the phrase "the second area A2 is disposed to form a plane in the opened state," a portion of the second area A2 may remain in the curved shape. Likewise, although it is stated that "in the closed state, the articulated hinge structure 113 and/or the second area A2 are received inside the second structure 102," a portion of the second area A2 of the articulated hinge structure 113 may be positioned outside the second structure 102.

According to an embodiment, the guide member, e.g., the roller 151, may be rotatably mounted on the second structure 102 in a position adjacent to an edge of the second structure 102 (e.g., the second plate 121a). For example, the roller 151 may be disposed adjacent to an edge (e.g., the portion indicated with reference denotation 1E') of the second plate 121a parallel to the first sidewall 123a. Although no reference denotation is assigned in the drawings, another sidewall may extend from the edge of the second plate 121a, and the sidewall adjacent to the roller 151 may be substantially parallel to the first sidewall 123*a*. According to an embodiment, the sidewall of the second structure 102 adjacent to the roller 151 may be formed of a material that transmits light, and a portion of the second area A2 may provide visual information via the portion of the second structure 102 while being received in the second structure 102.

According to various embodiments, an end of the roller 151 may be rotatably coupled to the second sidewall 123*b*, and the other end thereof may be rotatably coupled to the third sidewall 123*c*. For example, the roller 151 may be mounted on the second structure 102, rotating about the rotation axis R perpendicular to the sliding direction (e.g., direction ① indicated with the arrow in FIG. 1 or 2) of the first structure 101. The rotation axis R may be disposed substantially parallel to the first sidewall 123*a*, and may be positioned away from the first sidewall 123*a*, for example, at one edge of the second plate 121*a*. In one embodiment, the gap formed between the outer circumferential surface of the roller 151 and the inner surface of the edge of the second plate 121*a* may form an entrance through which the articulated hinge structure 113 or display 103 enters the second structure 102.

According to various embodiments, when the display 103 is deformed into a curved shape, the roller 151 maintains a radius of curvature of the display 103 to a certain degree, thereby suppressing excessive deformation of the display 103. The term "excessive deformation" may mean that the display 103 is deformed to have a radius of curvature that is too small to damage pixels or signal lines included in the flexible display 203. For example, the display 103 may be moved or deformed while being guided by the roller 151 and may be protected from damage due to excessive deformation. In some embodiments, the roller 151 may rotate while the articulated hinge structure 113 or the display 103 is inserted into or extracted from the second structure 102. For example, the friction between the articulated hinge structure 113 (or display 103) and the second structure 102 may be suppressed or prevented, allowing the articulated hinge structure 113 (or display 103) to smooth the insertion/extraction of the second structure 102.

According to various embodiments, the electronic device 100 may further include a guide rail(s) 155 and/or an actuating member(s) 157. The guide rail(s) 155 may be mounted on the second structure 102, e.g., the third plate 121*c* to guide a sliding of the first structure 101 (e.g., the first plate 111*a* or the slide plate). The actuating member(s) 157 may include a spring or a spring module that provides an elastic force in a direction along which two opposite ends thereof move away from each other, and a first end of the actuating member(s) 157 may be rotatably supported on the second structure 102, and a second end may be rotatably supported on the first structure 101.

According to various embodiments, when the first structure 101 slides, both the ends of the actuating member(s) 157 may be positioned closest to each other (hereinafter, a 'nearest point') at any one point between the closed state and the open state. For example, in the interval between the nearest point and the closed state, the actuating member(s) 157 may provide an elastic force to the first structure 101 in a direction moving toward the closed state and, in the interval between the nearest point and the opened state, the actuating member(s) 157 may provide an elastic force to the first structure 101 in a direction moving toward the opened state.

According to various embodiments, the antenna structure 161 may be disposed on at least one of the first structure 101 or the second structure 102. The antenna structure 161 may include a loop antenna formed of an array of electrically conductive bodies, e.g., electrically conductive lines, on a flat surface or flat plate. In an embodiment, the antenna structure 161 may include a patch antenna, a monopole antenna, a dipole antenna, or an inverted F-antenna depending on the arrangement or shape of the conductive bodies. The antenna structure may be configured to perform at least one of, e.g., near field communication, wireless power transmission/reception, and magnetic secure transmission. However, it should be noted that wireless communication through the antenna structure 161 is not limited thereto. For example, the electronic device 100 may access a mobile or cellular communication network, a local area network (LAN), a wireless local area network (WLAN), a wide area network (WAN), the Internet, or a small area network (SAN), using the antenna structure 161. According to an embodiment, the antenna structure 161 may include a first antenna 161*a* for magnetic secure transmission (MST) and/or near field communication and a second antenna 161*b* for near field communication and/or wireless power transmission. In an embodiment, the first antenna 161*a* may be configured to perform near field communication and/or wireless charging. The second antenna 161*b* may be utilized for magnetic secure transmission.

Figure 5:
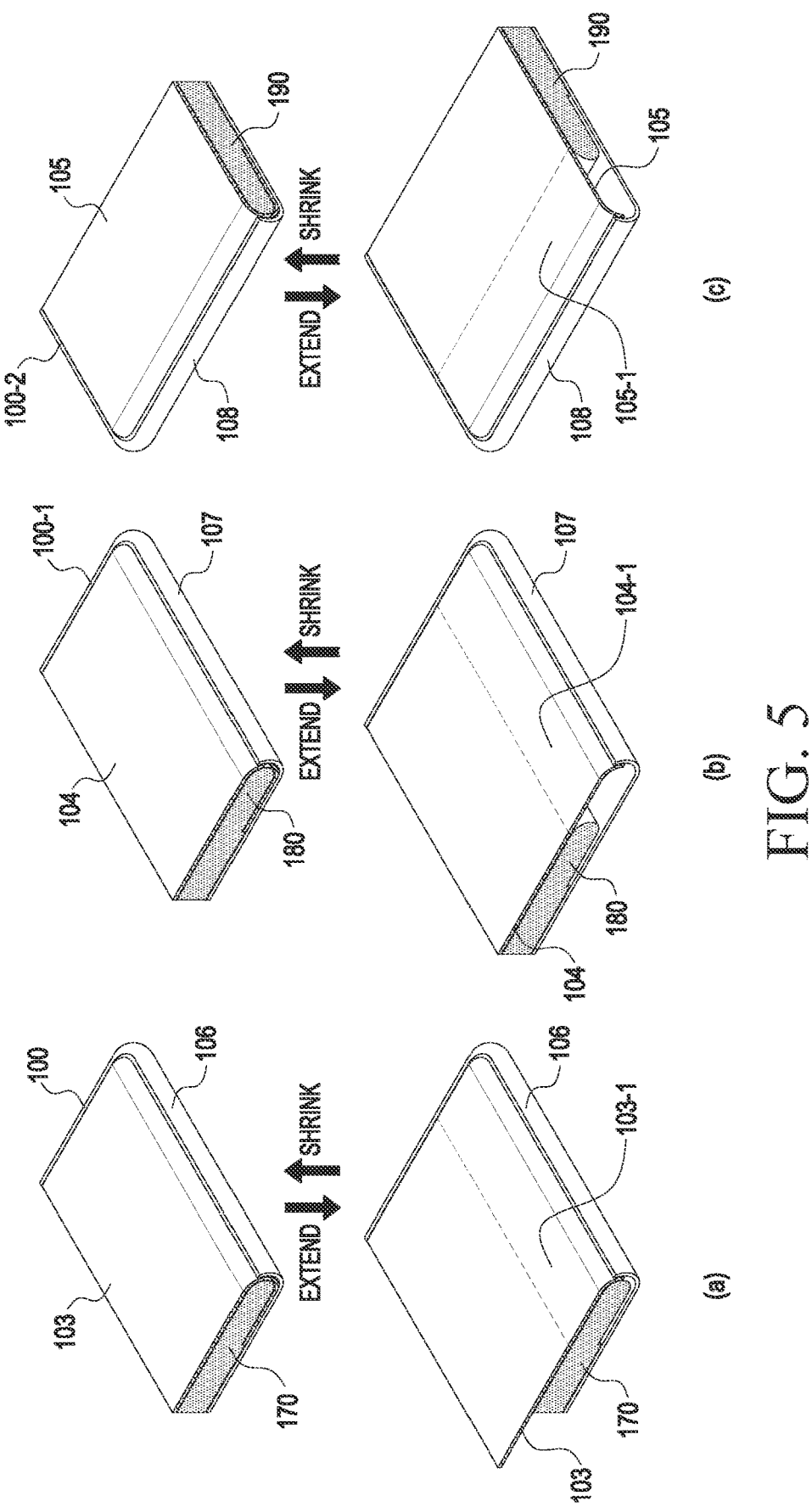
FIG. 5 is a view illustrating three types of electronic devices having a flexible display according to an embodiment of the disclosure.

FIG. 5 is a view illustrating three types of electronic devices having a flexible display according to an embodiment of the disclosure.

Referring to FIG. 5, electronic devices 100, 100-1, and 100-2 including a flexible display may be implemented in various forms depending on a manner in which the form factor is extended or transformed. For example, the electronic devices 100, 100-1, and 100-2 including a flexible display may include three types of devices.

According to various embodiments, referring to part (a) of FIG. 5, a first type (e.g., table type) of electronic device 100 may include a flexible display 103 and an electric object 170. In the electronic device 100, at least a portion of the housing may be covered by glass (or back glass) 106.

For example, the flexible display 103 may include a slidable or rollable display. The electric object 170 may include various types of electronic circuits and/or circuit boards. In a state in which a specific surface of the electronic device 100 is fixed, only the flexible display 103 may be extended, shrunken, or changed. Alternatively, in a state in which a specific surface of the electronic device 100 is fixed, the flexible display 103 and a supporting portion for supporting the flexible display 103 may together be extended, shrunken, or changed. For example, if the flexible display 103 is extended while the specific surface of the electronic device 100 is fixed, a rolled portion 103-1 of the flexible display 103 may be exposed on the front surface.

According to various embodiments, referring to part (b) of FIG. 5, a second type (e.g., drawer type) of electronic device 100-1 may include a flexible display 104 and an electric object 180. In the electronic device 100, at least a portion of the housing may be covered by glass (or back glass) 107. For example, the flexible display 104 may include a slidable or rollable display. The electric object 180 may include various types of electronic circuits and/or circuit boards. In a state in which a specific surface of the electronic device 100-1 is fixed, the flexible display 104, together with the electric object 180, may be extended, shrunken, or changed. For example, if the flexible display 104, together with the electric object 180, is extended while the specific surface of the electronic device 100 is fixed, a rolled portion 104-1 of the flexible display 104 may be exposed on the front surface.

According to various embodiments, referring to part (c) of FIG. 5, a first type (e.g., table type) of electronic device 100 may include a flexible display 105 and an electric object 190. In the electronic device 100, at least a portion of the housing may be covered by glass (or back glass) 108. For example, the flexible display 105 may include a slidable or rollable display. The electric object 190 may include various types of electronic circuits and/or circuit boards. In the electronic device 100-2, as the main body moves, and the rolled portion of the flexible display 105 is unrolled out, the flexible display 105 may be extended, shrunken, or changed. However, in the electronic device 100-2, the electric object 190 may not move as compared to part (b) of FIG. 5. For example, if the flexible display 105 is extended while the main body moves, a rolled portion 105-1 of the flexible display 105 may be exposed on the front surface.

Figure 6:
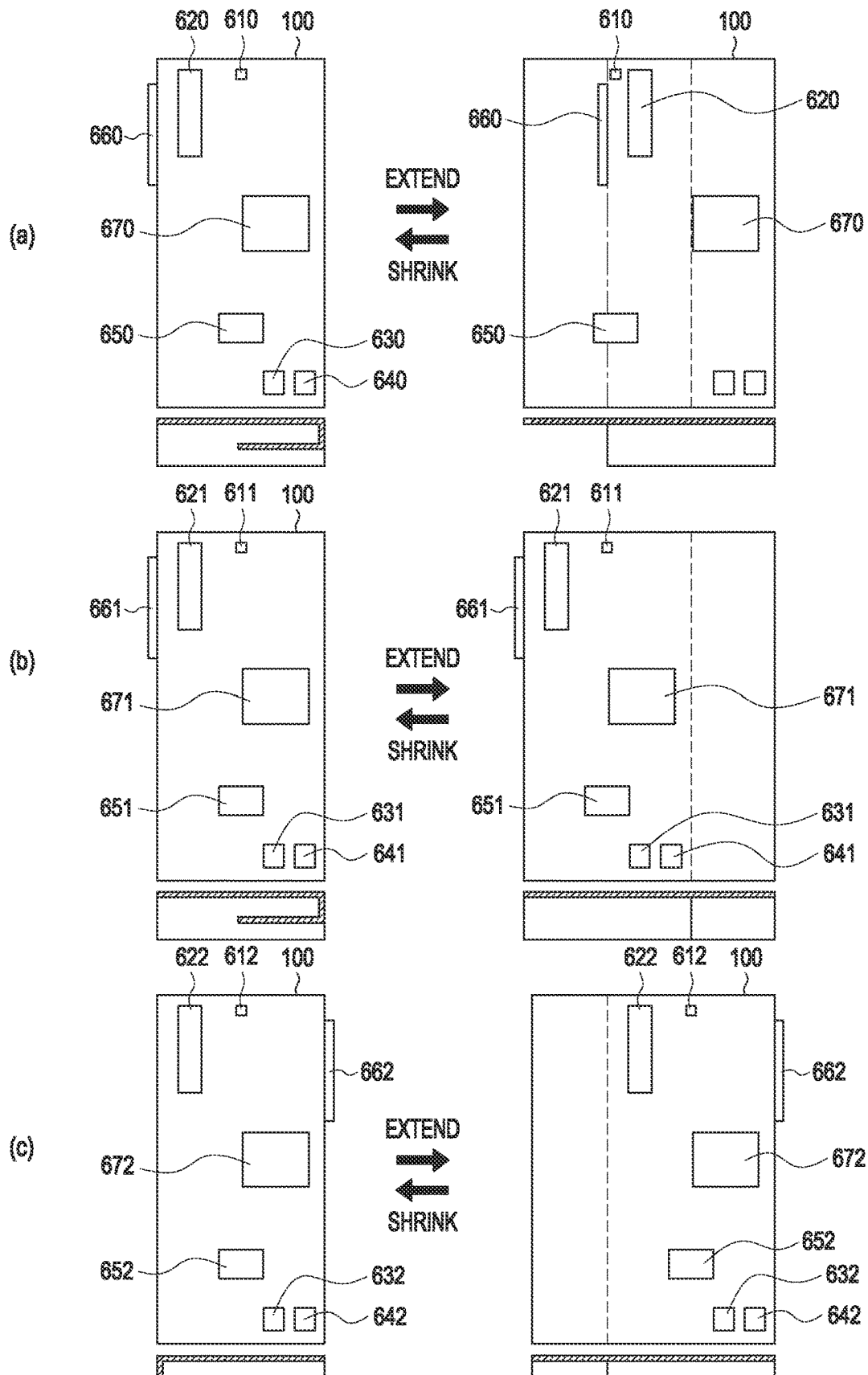
FIG. 6 is a view illustrating three types of electronic devices having a flexible display according to an embodiment of the disclosure.

FIGS. 6 and 7 are views illustrating three types of electronic devices having a flexible display according to various embodiments of the disclosure.

According to various embodiments, referring to part (a) of FIG. 6, an electronic device 100 may include a front camera 610, a rear camera 620, a microphone 630, a speaker 640, a first fingerprint sensor 650, a second fingerprint sensor 660, and a near field communication (NFC) module 670. The electronic device 100 may further include an iris sensor (not shown). Meanwhile, for convenience of description, in the following description, it is assumed that the front camera 610, the rear camera 620, the microphone 630, the speaker 640, the first fingerprint sensor 650, the second fingerprint sensor 660, and NFC module 670 are sensors.

According to various embodiments, referring to part (a) of FIG. 6 and FIG. 7, in the electronic device 100, if the flexible display (e.g., the flexible display 103 of FIG. 5) is extended, the position of at least one sensor included in the electronic device 100 may be changed. For example, if the flexible display 103 is extended, the positions of the front camera 610 and the first fingerprint sensor 650 may be changed. The positions of the remaining sensors (e.g., 620, 630, 660, and 670) may not be changed.

According to various embodiments, referring to part (b) of FIG. 6, an electronic device 100-1 may include a front camera 611, a rear camera 621, a microphone 631, a speaker 641, a first fingerprint sensor 651, a second fingerprint sensor 661, and an NFC module 671. The electronic device 100-1 may further include an iris sensor (not shown).

According to various embodiments, referring to part (b) of FIG. 6 and FIG. 7, in the electronic device 100-1, if the flexible display (e.g., the flexible display 104 of FIG. 5) is extended, the position of at least one sensor included in the electronic device 100-1 may be changed. For example, if the flexible display 104 is extended, the positions of the front camera 611, the rear camera 621, the first fingerprint sensor 651, the second fingerprint sensor 661, and the NFC module 671 may be changed. The positions of the remaining sensors (e.g., 631 and 641) may not be changed.

According to various embodiments, referring to part (c) of FIG. 6, an electronic device 100-2 may include a front camera 612, a rear camera 622, a microphone 632, a speaker 642, a first fingerprint sensor 652, a second fingerprint sensor 662, and an NFC module 672. The electronic device 100-2 may further include an iris sensor (not shown).

According to various embodiments, referring to part (c) of FIG. 6 and FIG. 7, in the electronic device 100-2, if the flexible display (e.g., the flexible display 105 of FIG. 5) is extended, the positions of the sensors 612, 622, 632, 642, 652, 662, and 672 included in the electronic device 100-2 may not be changed. However, according to another embodiment, if the flexible display 105 is extended, the position of at least one sensor included in the electronic device 100-2 may be changed.

Meanwhile, the types of electronic devices described in connection with FIGS. 5 to 7 are merely examples, and the technical spirit of the disclosure may not be limited thereto. For example, the electronic device may include various types of flexible displays. Further, the type of the sensors whose positions are changed as the flexible display included in the electronic device is extended may not be limited thereto.

According to various embodiments, the operation of identifying whether the electronic device 100, 100-1, and 100-2 identifies whether the position of the sensor is moved (or fixed) may be determined based on which one of the fixed portion (e.g., a portion which is fixed regardless of a slide, a basic mechanical structure) and a moving portion (e.g., a portion which is moved according to a slide, a structure supporting the extended display) of the electronic device 100, 100-1, or 100-2 the sensor is disposed on. For example, if the sensor is disposed on the moving portion, the electronic device 100, 100-1, or 100-2 may determine that the sensor is moved by a slide of the flexible display 103, 104, and 105. Alternatively, if the sensor is disposed on the fixed portion, the electronic device 100, 100-1, or 100-2 may determine that the sensor is fixed regardless of a slide of the flexible display 103, 104, and 105.

According to various embodiments, the operation of identifying the position of the sensor by the electronic device 100, 100-1, or 100-2 may be determined based on the coordinates (or position or area) of the flexible display 103, 104, and 105.

According to another embodiment, the electronic device 100, 100-1, or 100-2 may determine whether the position of the sensor is moved (or fixed) based on the coordinates (or position) of the flexible display 103. For example, upon identifying that the position of the sensor is changed based on the coordinates of the flexible display 103, the electronic device 100 may determine that the position of the sensor is moved. In this case, the operation of identifying whether the position of the sensor is moved depending on whether the sensor is disposed on the fixed portion or moving portion of the electronic device 100, 100-1, or 100-2 may be omitted.

According to various embodiments, the electronic device 100, 100-1, or 100-2 may include a processor. For example, the processor may control the overall operation of the electronic device 100, 100-1, or 100-2. Further, the processor may be disposed in the housing of the electronic device 100, 100-1, or 100-2. Operations of the electronic devices 100, 100-1, and 100-2 described below may be controlled by the processor.

Meanwhile, for convenience of description, the following description focuses primarily on embodiments in which the operations are performed by the electronic device 100. However, the technical spirit of the disclosure is not limited thereto and may be applied to various types of electronic devices (e.g., 100-1 and 100-2) including a flexible display. Further, although the following description focuses primarily on the extension of the flexible display 103 in the operation of the electronic device 100, the technical spirit of the disclosure may not be limited thereto. For example, the operation in which the flexible display 103 is shrunken may be performed in an opposite manner to that of the extension of the flexible display 103.

Figures 8A, 8B:
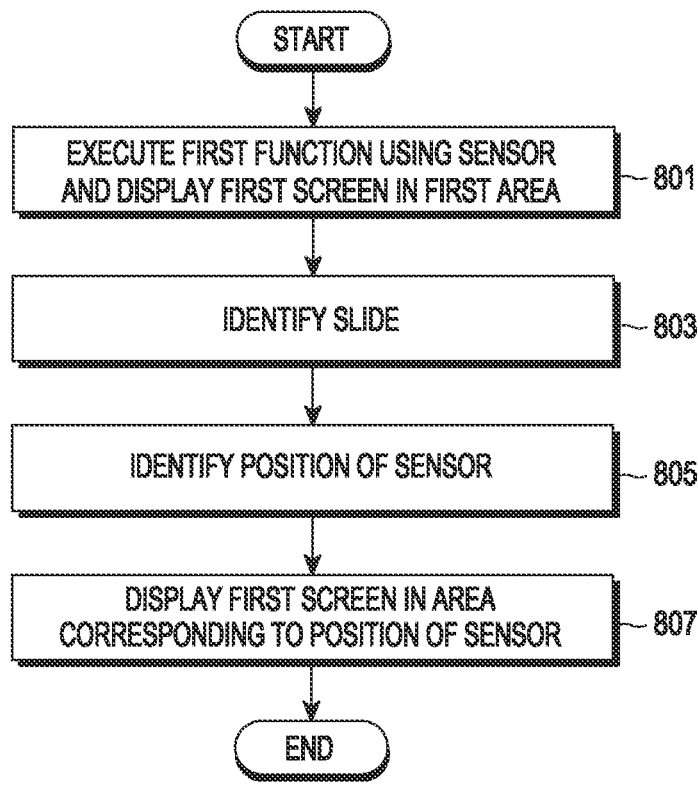
FIG. 8A is a flowchart illustrating a method for displaying a screen by an electronic device according to an embodiment of the disclosure.
FIG. 8B is a table illustrating a method for identifying a sensor used by applications by an electronic device according to an embodiment of the disclosure.

FIG. 8A is a flowchart illustrating a method for displaying a screen by an electronic device according to an embodiment of the disclosure.

Referring to FIG. 8A, in operation 801, the electronic device 100 may execute a first function using a specific sensor included in the electronic device 100. Further, in operation 801, if the first function is executed (or performed), the electronic device 100 may display a first screen related to the first function in a first area of the flexible display (e.g., the flexible display 103 of FIG. 5). For example, the first screen may be an execution screen of an application for executing the first function.

According to various embodiments, in operation 803, the electronic device 100 may identify a slide of the flexible display 103. For example, the electronic device 100 may identify whether the flexible display 103 is extended or shrunken by the slide of the flexible display 103.

According to various embodiments, in operation 805, the electronic device 100 may identify the position of a specific sensor related to the first function based on the slide. For example, the position of the specific sensor may be changed by the slide. The electronic device 100 may identify the position (e.g., coordinate information) of the specific sensor based on the position (e.g., coordinate information) of the specific sensor, pre-stored in the non-extended state, and the distance of the extension of the flexible display by the slide. Alternatively, the position of the specific sensor may not be changed regardless of a slide. The electronic device 100 may determine that the position (e.g., coordinate information) of the specific sensor, pre-stored in the non-extended state, is the position of the specific sensor.

According to various embodiments, in operation 807, the electronic device 100 may display a first screen in the area corresponding to the position of the sensor. For example, when the position of the sensor is changed by a slide, the electronic device 100 may display the first screen in a second area corresponding to the changed position of the sensor. Alternatively, when the position of the sensor is not changed by a slide, the electronic device 100 may display the first screen in the existing first area. Further, when the position of the sensor is not changed by a slide, the electronic device 100 may display a visual object indicating the position of the sensor in the area where the sensor is positioned.

FIG. 8B is a table illustrating a method for identifying a sensor used by applications by an electronic device according to an embodiment of the disclosure.

According to various embodiments, the electronic device 100 may identify a sensor (or type of sensor) related to the first function. For example, the electronic device 100 may identify permission information or authority information about an application for performing the first function and identify a sensor for performing the first function of the application.

Referring to FIG. 8B, according to various embodiments, the electronic device 100 may identify the sensor related to a specific function or a specific application based on a pre-stored table 850. For example, the electronic device 100 may determine that a sensor related to a video call function or application is a front camera, a microphone, or a speaker. Alternatively, the electronic device 100 may determine that a sensor related to a banking service-related function or application is a fingerprint sensor or an iris sensor.

According to various embodiments, for the same application, whether to use the sensor and the type of the used sensor may be changed depending on the screen (or page) displayed on the flexible display 103. For example, if an authentication screen for user authentication is displayed when calling in a state in which an application using a video call function is running, the fingerprint sensor may be used. Thereafter, if user authentication is completed, a screen displaying images using the front camera may be displayed.

According to various embodiments, for the same application, if the type of the sensor used for the application, the electronic device 100 may change (or redeploy) the screen. For example, if an authentication screen for user authentication is displayed when calling in a state in which an application using a video call function is running, the electronic device 100 may display an authentication screen in a position adjacent to the fingerprint sensor. Thereafter, if user authentication is completed, the electronic device 100 may display an image-displaying screen in a position adjacent to the front camera.

Meanwhile, the table 850 of FIG. 8B is merely an example, and the technical spirit of the disclosure may not be limited thereto. Further, the electronic device 100 may change the configuration of the table 850 by the user or automatically by the processor.

Figure 9:
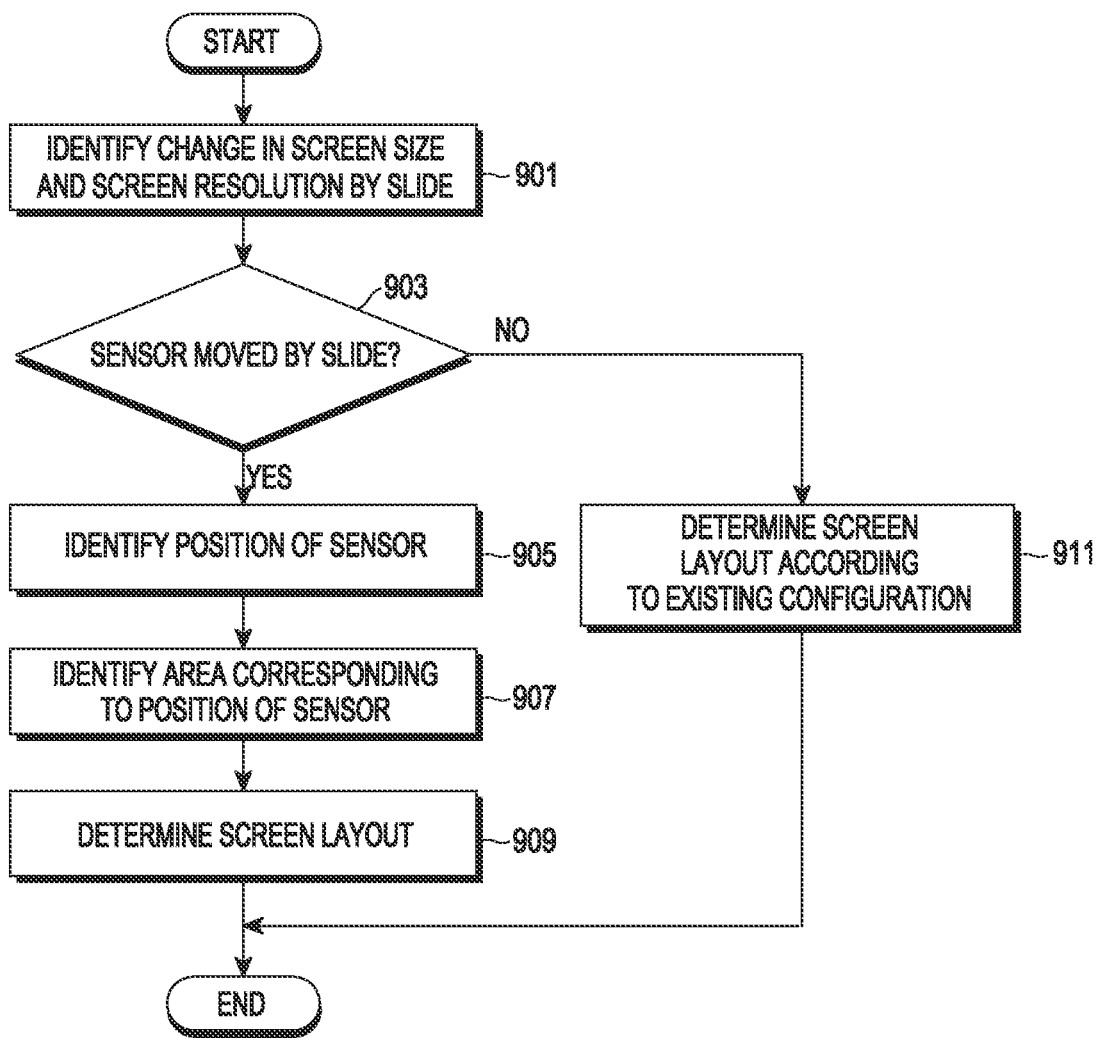
FIG. 9 is a flowchart illustrating a method for deploying a screen by an electronic device according to an embodiment of the disclosure.

FIG. 9 is a flowchart illustrating a method for deploying a screen by an electronic device according to an embodiment of the disclosure.

According to various embodiments, referring to FIG. 9, the electronic device 100 may display a first screen in a first area of the flexible display (e.g., the flexible display 103 of FIG. 5). For example, the first screen may be a screen for performing a specific function or an execution screen of an application performing the specific function. For example, the first area may be an area where the first screen is displayed by a predetermined screen layout configuration after the application for performing the specific function is executed. If the first screen is displayed, the electronic device 100 may identify the sensor (or type of sensor) for performing the specific function.

According to various embodiments, in operation 901, the electronic device 100 may identify whether the screen size and screen resolution are changed by a slide of the flexible display 103. For example, the electronic device 100 may identify whether the screen size and screen resolution are changed by a reference value or more. For example, the reference value may be a value by which the user may recognize a change in screen size or screen resolution. Further, the reference value may be preset.

According to various embodiments, in operation 903, the electronic device 100 may identify whether a sensor for performing a specific function is moved by a slide of the flexible display 103.

According to various embodiments, upon identifying that the sensor for performing the specific function is moved by a slide (yes in operation 903), the electronic device 100 may identify the position of the sensor based on the moved distance of the flexible display 103, in operation 905. For example, the electronic device 100 may identify coordinate information about the sensor based on the pre-stored sensor position and the moved distance of the flexible display 103.

According to various embodiments, in operation 907, the electronic device 100 may identify the area corresponding to the position of the sensor in the entire area of the flexible display 103 extended by a slide. For example, the electronic device 100 may divide the entire area of the flexible display 103 extended by the slide into a plurality of areas and identify an area which is positioned adjacent to the sensor among the divided areas.

According to various embodiments, in operation 909, the electronic device 100 may determine the screen layout of the first screen based on the slide of the flexible display 103. For example, the electronic device 100 may dispose the first screen in the second area, adjacent to the position of the sensor, among the plurality of areas included in the entire area of the flexible display 103 extended by the slide. In other words, the electronic device 100 may change the position of display of the first screen according to a slide. For example, the electronic device 100 may change the position of the first screen continuously according to a slide. Alternatively, after the slide is completed, the electronic device 100 may change the position of the first screen. Alternatively, the electronic device 100 may display a screen (e.g., a resized screen of the first screen or a screen (e.g., a visual object) related to the first screen) corresponding to the first screen, instead of the first screen, in the second area.

According to various embodiments, upon identifying that the sensor for performing the specific function by a slide is not moved (no in operation 903), the electronic device 100 may determine the screen layout of the first screen according to the existing screen layout configuration, in operation 911. For example, the electronic device 100 may determine the layout of the first screen without considering the position of the sensor. According to another embodiment, although the position of the sensor is not changed, the electronic device 100 may determine the layout of the first screen considering an increase in the screen size of the flexible display 103. For example, although the position of the sensor is not changed, the electronic device 100 may determine the screen layout so that the first screen is displayed in an area close to the position of the sensor.

Figure 10A:
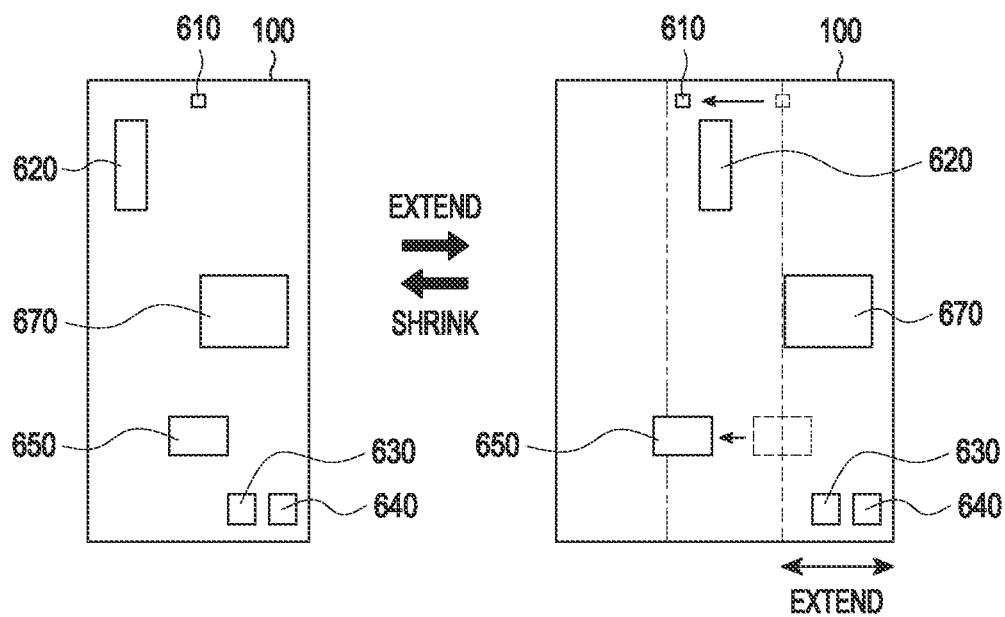
FIGS. 10A and 10B are block diagrams illustrating a method for identifying a position of a sensor according to a slide of a display by an electronic device according to various embodiments of the disclosure.
Figure 10B:
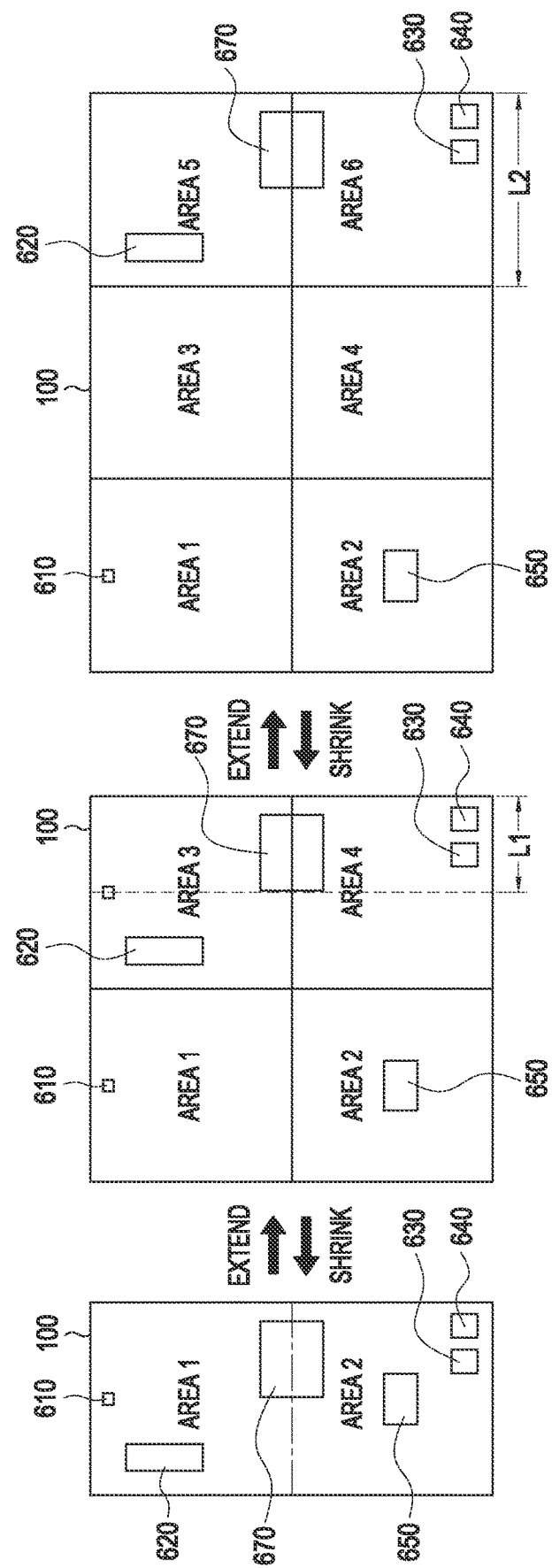

FIGS. 10A and 10B are block diagrams illustrating a method for identifying a position of a sensor according to a slide of a display by an electronic device according to various embodiments of the disclosure.

Referring to FIGS. 10A and 10B, an electronic device 100 may include a front camera 610, a rear camera 620, a microphone 630, a speaker 640, a first fingerprint sensor 650, and an NFC module 670.

Referring to FIG. 10A, the electronic device 100 may identify a slide of the flexible display (e.g., the flexible display 103 of FIG. 5). Upon identifying the slide, the electronic device 100 may identify the position of at least one of sensors 610, 620, 630, 640, 650, and 670. For example, upon identifying the slide, the electronic device 100 may identify the position of the sensor related to the application currently running or whose execution screen is displayed on the flexible display 103. For example, the electronic device 100 may identify coordinate information about the sensor based on the pre-stored sensor position and the moved distance of the flexible display 103.

According to various embodiments, the electronic device 100 may identify a change in the position of the front camera 610 based on a slide and identify the position of the front camera 610. For example, the electronic device 100 may determine that the position of the front camera 610 is moved left by the slid distance. Further, the electronic device 100 may identify a change in the position of the first fingerprint sensor 650 based on a slide and identify the position of the first fingerprint sensor 650. For example, the electronic device 100 may determine that the position of the first fingerprint sensor 650 is moved left by the slid distance. Meanwhile, the electronic device 100 may identify that the sensors 620, 630, 640, 660, and 670, other than the front camera 610 and the first fingerprint sensor 650, are not changed in position based on the slide.

Referring to FIG. 10B, the electronic device 100 may identify the area corresponding to the position of the sensor in the area of the flexible display 103 extended by a slide. For example, the electronic device 100 may divide the flexible display 103 into two areas (e.g., a first area and a second area) before the slide occurs. The electronic device 100 may divide the area of the flexible display 103 into four areas (e.g., first area to fourth area) based on a first distance L1 moved by the slide and identify the area adjacent to the position of the sensor among the divided areas (e.g., first area to fourth area). For example, the electronic device 100 may identify the first area adjacent to the front camera 610 and identify the second area adjacent to the first fingerprint sensor 650. Similarly, the electronic device 100 may divide the area of the flexible display 103 into six areas (e.g., first area to sixth area) based on a second distance L2 moved by the slide and identify the area adjacent to the position of the sensor among the divided areas (e.g., first area to sixth area). For example, the electronic device 100 may identify the first area adjacent to the front camera 610 and identify the second area adjacent to the first fingerprint sensor 650. For example, the electronic device 100 may determine the number of divided screens based on the screen size and screen resolution changed according to the distance moved by the slide.

According to various embodiments, the electronic device 100 may display the screen related to the sensor in the area adjacent to the position of the sensor among the plurality of areas included in the area of the flexible display 103 extended by the slide. For example, the electronic device 100 may display the screen related to the function using the front camera in the first area based on a slide. Further, the electronic device 100 may display the screen related to the function using the fingerprint sensor in the second area based on a slide.

Figure 11A:
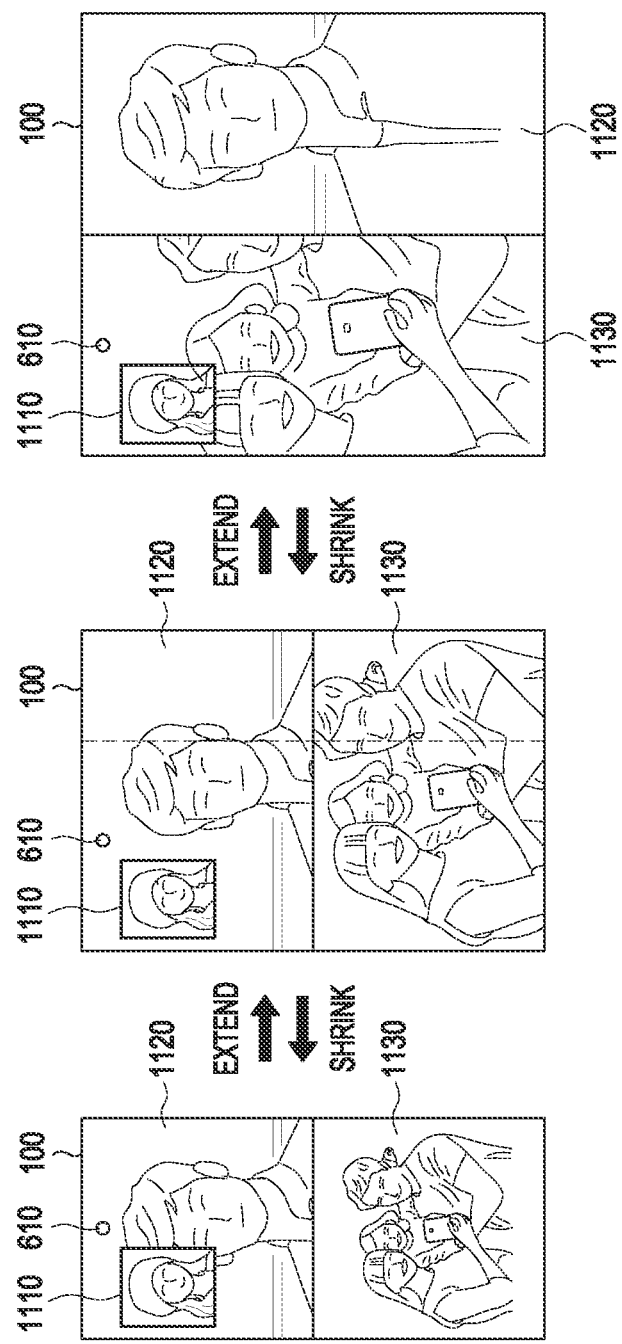
FIGS. 11A and 11B are views illustrating a method for displaying a screen according to a position of a sensor by an electronic device according to various embodiments of the disclosure.
Figure 11B:
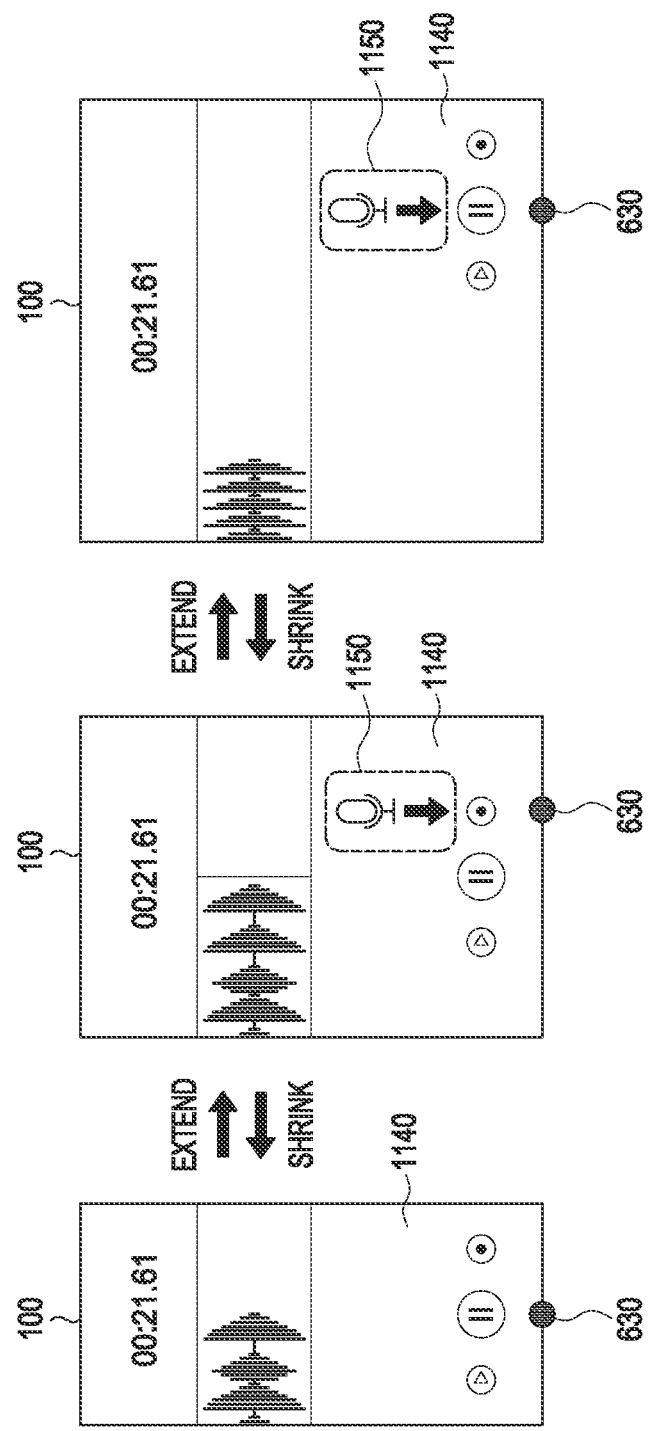

FIGS. 11A and 11B are views illustrating a method for displaying a screen according to a position of a sensor by an electronic device according to various embodiments of the disclosure.

Referring to FIG. 11A, the electronic device 100 may execute a single application (e.g., a video call application) using the front camera 610 and display screens 1110, 1120, and 1130 of the single application. For example, among the screens 1110, 1120, and 1130, a first screen 1110 may include an image captured of the user through the front camera 610. For example, the first screen 1110 may be displayed on a second screen 1120.

According to various embodiments, the electronic device 100 may identify a slide of the flexible display (e.g., the flexible display 103 of FIG. 5). The electronic device 110 may identify the position of the front camera 610 based on the slide. For example, the position of the front camera 610 may be changed by the slide. Further, the electronic device 100 may change the physical size and resolution of the screen based on the slide.

According to various embodiments, upon identifying a first slide (e.g., first extension), the electronic device 100 may change the screen size and screen resolution of the first screen 1110, the second screen 1120, and a third screen 1130. The electronic device 100 may not change the screen layout of the first screen 1110, the second screen 1120, and the third screen 1130 based on the position of the front camera 610.

According to various embodiments, upon identifying a second slide (e.g., second extension), the electronic device 100 may display the first screen 1110 including the user's image captured using the front camera 610 in an area adjacent to the front camera 610. For example, the electronic device 100 may change the display position of the first screen 1110 (in real-time) by tracking the position of the front camera 610 according to the slide. The electronic device 100 may also change the screen layout of the first screen 1110, the second screen 1120, and the third screen 1130. Further, the electronic device 100 may change the screen size and resolution of the first screen 1110, the second screen 1120, and the third screen 1130.

Referring to FIG. 11B, the electronic device 100 may execute a single application (e.g., a recording application) using the microphone 630 and display a fourth screen 1140 of the single application. For example, the fourth screen may be an execution screen of the single application.

According to various embodiments, the electronic device 100 may identify a slide of the flexible display (e.g., the flexible display 103 of FIG. 5). The electronic device 110 may identify the position of the microphone 630 based on the slide. For example, the position of the microphone 630 may not be changed by the slide. Further, the electronic device 100 may change the physical size and resolution of the screen based on the slide.

According to various embodiments, upon identifying a first slide (e.g., first extension), the electronic device 100 may change the screen size and resolution of the fourth screen 1140. The electronic device 100 may display a visual object 1150 on the fourth screen 1140 based on the position of the microphone 630. For example, the visual object 1150 may indicate the position of the microphone 630. Accordingly, the visual object 1150 may be displayed in an area adjacent to the microphone 630.

According to various embodiments, upon identifying a second slide (e.g., second extension), the electronic device 100 may change the screen size and resolution of the fourth screen 1140. The electronic device 100 may display the visual object 1150 in the area adjacent to the microphone 630 based on the position of the microphone 630. For example, the electronic device 100 may change the display position of the visual object 1150 (in real-time) by tracking the position of the microphone 630 according to the slide.

Figure 12:
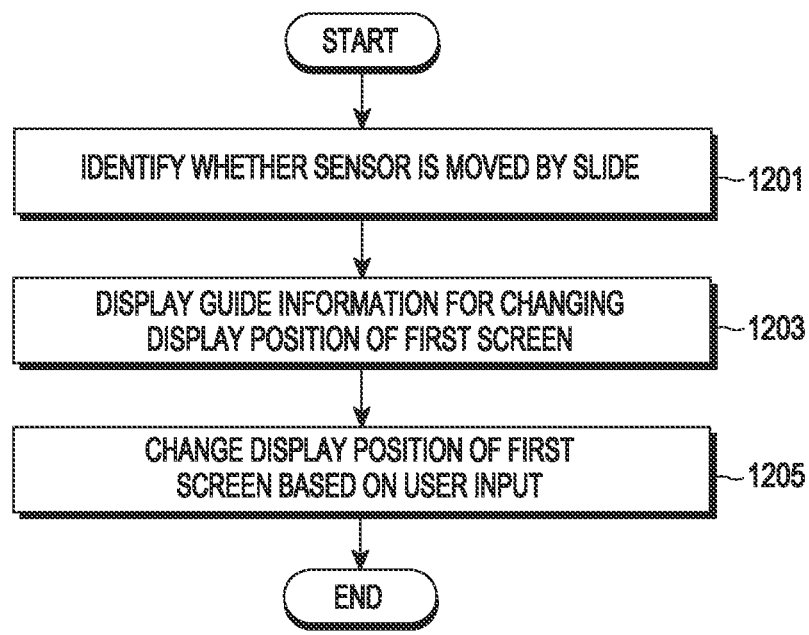
FIG. 12 is a flowchart illustrating a method for changing a position of display of a screen by providing guide information by an electronic device according to an embodiment of the disclosure.

FIG. 12 is a flowchart illustrating a method for changing a position of display of a screen by providing guide information by an electronic device according to an embodiment of the disclosure.

Referring to FIG. 12, the electronic device 100 may display a first screen related to a specific function on the flexible display (e.g., the flexible display 103 of FIG. 5). In operation 1201, upon identifying a slide of the flexible display 103, the electronic device 100 may identify whether a sensor for performing the specific function is moved by the slide.

According to various embodiments, in operation 1203, if the position of the sensor is changed by the slide, the electronic device 100 may display guide information for changing the display position of the first screen. For example, the guide information may include a message for notifying the user of changing the display position of the first screen to the area where the sensor is positioned.

According to various embodiments, in operation 1205, the electronic device 100 may change the display position of the first screen based on a user input to the guide information. For example, upon identifying a user input indicating acceptance of the change in the position of the first screen included in the guide information, the electronic device 100 may display the display position of the first screen in the area adjacent to the position of the sensor. In contrast, unless a user input indicating acceptance of the change in the position of the first screen included in the guide information is identified, the electronic device 100 may not change the display position of the first screen.

Figure 13:
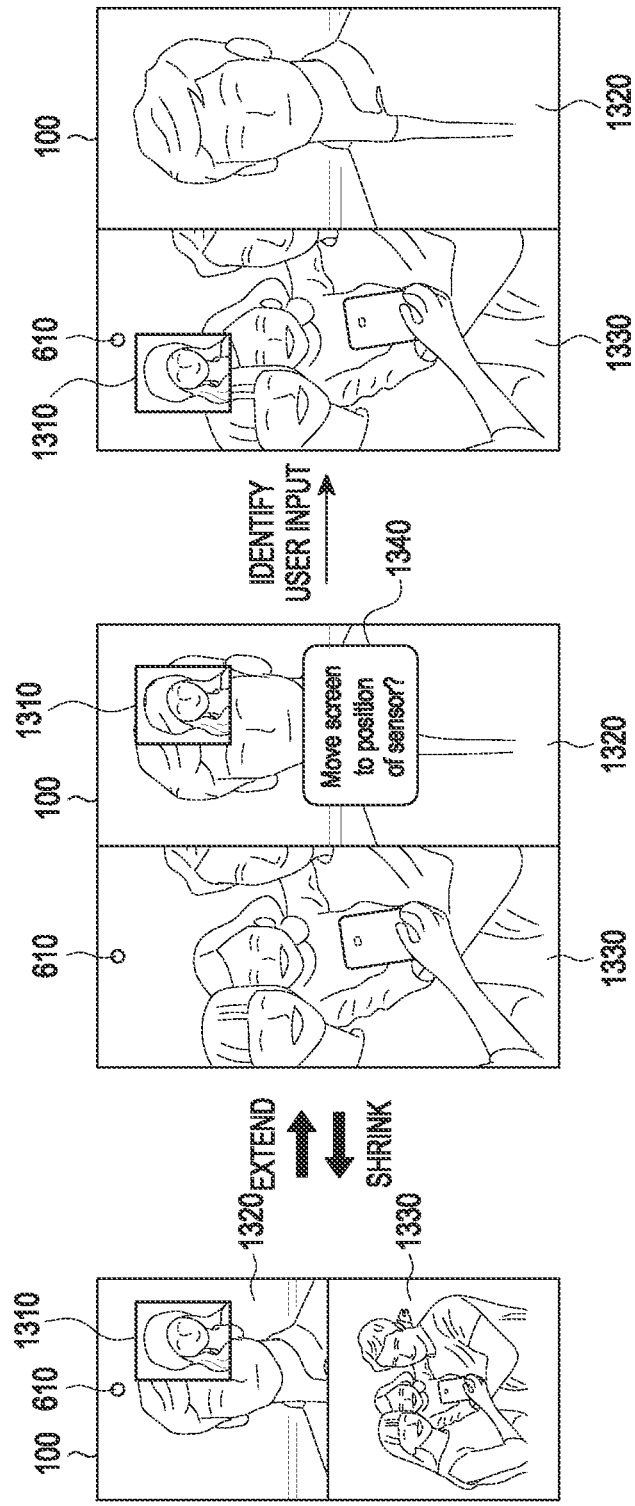
FIG. 13 is a view illustrating a method for changing a position of display of a screen by providing guide information by an electronic device according to an embodiment of the disclosure.

FIG. 13 is a view illustrating a method for changing a position of display of a screen by providing guide information by an electronic device according to an embodiment of the disclosure.

Referring to FIG. 13, the electronic device 100 may display a first screen 1310, a second screen 1320, and a third screen 1330 related to a specific function (e.g., a video call function) on the flexible display (e.g., the flexible display 103 of FIG. 5). The first screen 1310 may include an image captured of the user through the front camera 610. For example, the first screen 1310 may be displayed on the second screen 1320.

According to various embodiments, upon identifying a slide of the flexible display 103, the electronic device 100 may identify whether the front camera 610 for performing the specific function is moved by the slide. The electronic device 100 may display guide information 1340 upon identifying that the front camera 610 is moved by the guide. For example, the guide information 1340 may include a message for notifying the user of changing the display position of the first screen to the area where the sensor is positioned. The electronic device 100 may not change the display position of the first screen 1310 until a user input to the guide information 1340 is identified.

According to various embodiments, the electronic device 100 may determine whether to change the display position of the first screen 1310 based on a user input to the guide information 1340. For example, upon identifying a user input indicating acceptance of the change in display position, the electronic device 100 may display the display position of the first screen 1310 in the area adjacent to the position of the front camera 610. In this case, the electronic device 100 may display the first screen 1310 through a popup window. In contrast, unless a user input indicating acceptance of the change in display position is identified, the electronic device 100 may not change the display position of the first screen 1310.

Figure 14:
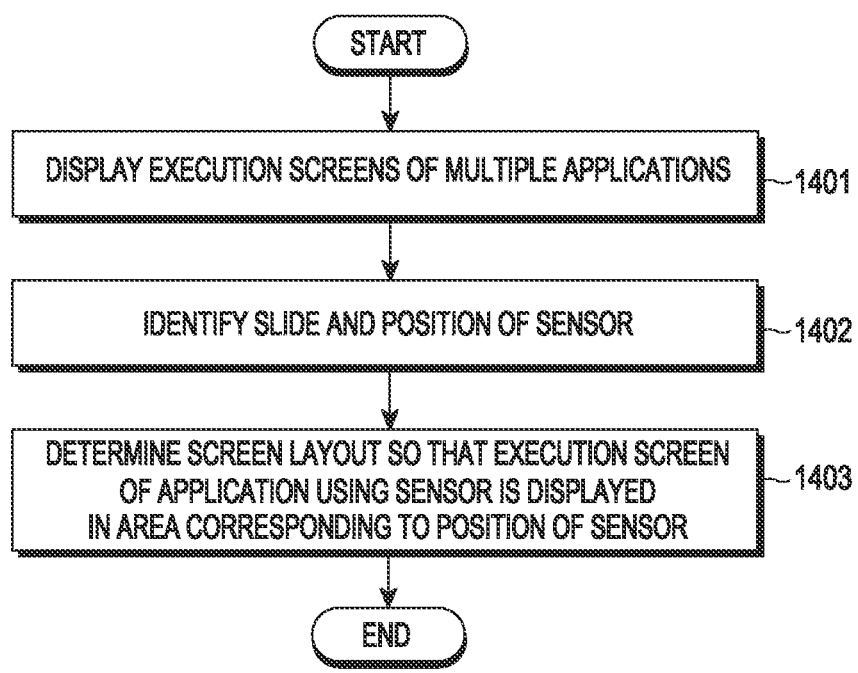
FIG. 14 is a flowchart illustrating a method for displaying execution screens of a plurality of applications by an electronic device according to an embodiment of the disclosure.

FIG. 14 is a flowchart illustrating a method for displaying execution screens of a plurality of applications by an electronic device according to an embodiment of the disclosure.

Referring to FIG. 14, in operation 1401, the electronic device 100 may display execution screens of a plurality of applications together. For example, at least one of the plurality of applications may use a sensor included in the electronic device 100.

According to various embodiments, in operation 1402, the electronic device 100 may identify a slide of the flexible display (e.g., the flexible display 103 of FIG. 5) and identify the position of the sensor (e.g., a sensor used by at least one of the plurality of applications) according to the slide.

According to various embodiments, in operation 1403, the electronic device 100 may determine a screen layout of the plurality of execution screens so that the execution screen of the application using the sensor among the plurality of applications is displayed in the area corresponding to the position of the sensor, based on the position of the sensor.

Figure 15A:
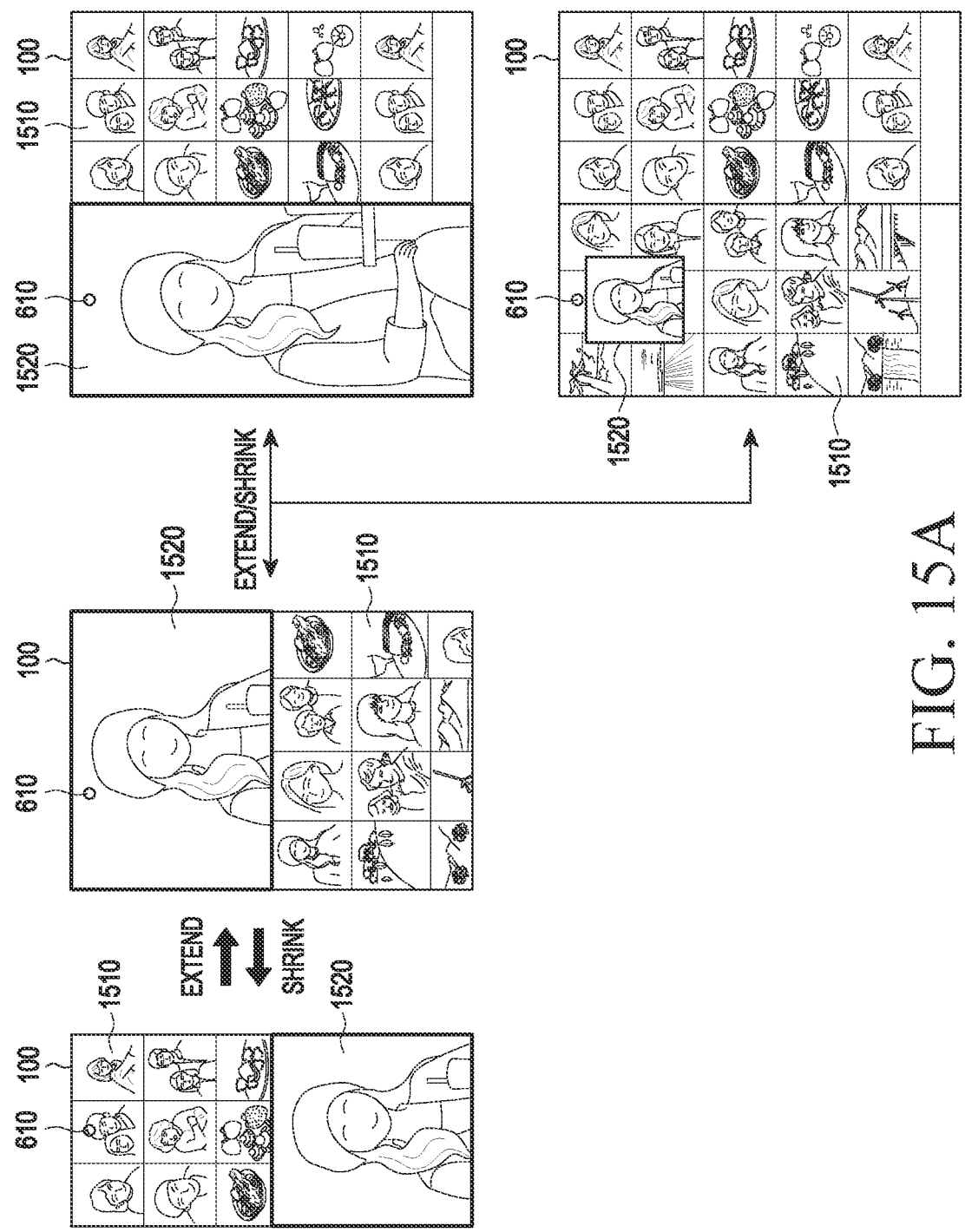
FIGS. 15A and 15B are views illustrating a method for displaying execution screens of a plurality of applications by an electronic device according to various embodiments of the disclosure.
Figure 15B:
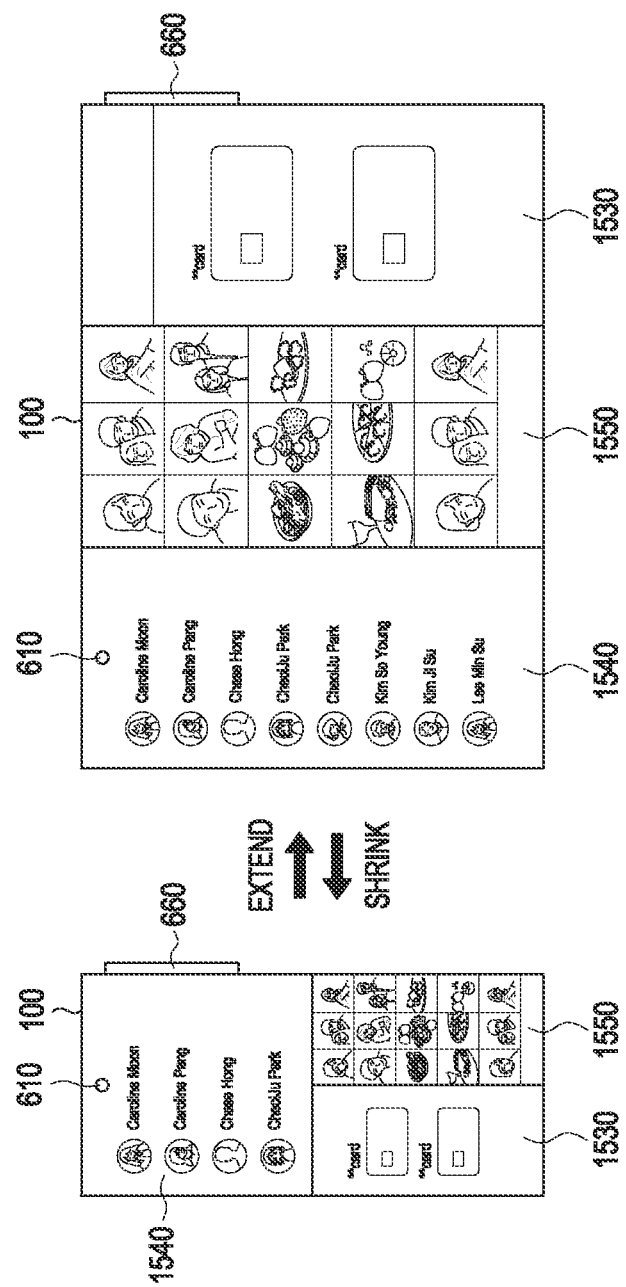

FIGS. 15A and 15B are views illustrating a method for displaying execution screens of a plurality of applications by an electronic device according to various embodiments of the disclosure.

Referring to FIG. 15A, the electronic device 100 may display a first execution screen 1510 of a first application and a second execution screen 1520 of a second application. For example, the first application may be an application that does not use the front camera 610, and the second application may be an application (e.g., a video call application) using the front camera 610.

According to various embodiments, upon identifying a first slide, the electronic device 100 may change the screen layout of the first execution screen 1510 and the second execution screen 1520 based on the distance of the second slide. For example, the electronic device 100 may change the screen layout so that the second execution screen 1520 is displayed in the area adjacent to the front camera 610. For example, the electronic device 100 may change the layout of the first execution screen 1510 and the second execution screen 1520 so that they are positioned one below the other.

According to various embodiments, upon identifying a second slide (e.g., second extension), the electronic device 100 may change the screen layout of the first execution screen 1510 and the second execution screen 1520 based on the distance of the second slide. For example, the electronic device 100 may change the screen layout so that the second execution screen 1520 is displayed in the area adjacent to the front camera 610. For example, the electronic device 100 may change the screen layout so that the second execution screen 1520 is displayed on the left side while the first execution screen 1510 is displayed on the right side.

According to another embodiment, upon identifying the second slide (e.g., second extension), the electronic device 100 may display the first execution screen 1510 in the entire area of the flexible display and display the second execution screen 1520 on the first execution screen 1510 through a popup window. Further, the electronic device 100 may display the popup window including the second execution screen 1520 in an area adjacent to the front camera 610. For example, although the position of the second execution screen 1520 is moved to a different area, the electronic device 100 may automatically move the second execution screen 1520 back to the area adjacent to the front camera 610.

Referring to FIG. 15B, the electronic device 100 may display a third execution screen 1530 of a third application, a fourth execution screen 1540 of a fourth application, and a fifth execution screen 1550 of a fifth application. For example, the third application may be an application (e.g., a payment application) using the second fingerprint sensor 660, the fourth application may be an application (e.g., a video call application) using the front camera 610, and the fifth application may be an application that does not use a sensor.

According to various embodiments, upon identifying a slide of the flexible display 103, the electronic device 100 may change the screen layout of the third execution screen 1530, the fourth execution screen 1540, and the fifth execution screen 1550 based on the distance of the slide. For example, the electronic device 100 may change the screen layout so that the third execution screen 1530 is displayed in an area adjacent to the second fingerprint sensor 660, and the fourth execution screen 1540 is displayed in an area adjacent to the front camera 610. For example, the electronic device 100 may determine the screen layout first considering the execution screen of the application using a sensor. Alternatively, the electronic device 100 may determine the screen layout considering the user's execution screen layout pattern previously stored.

Figure 16A:
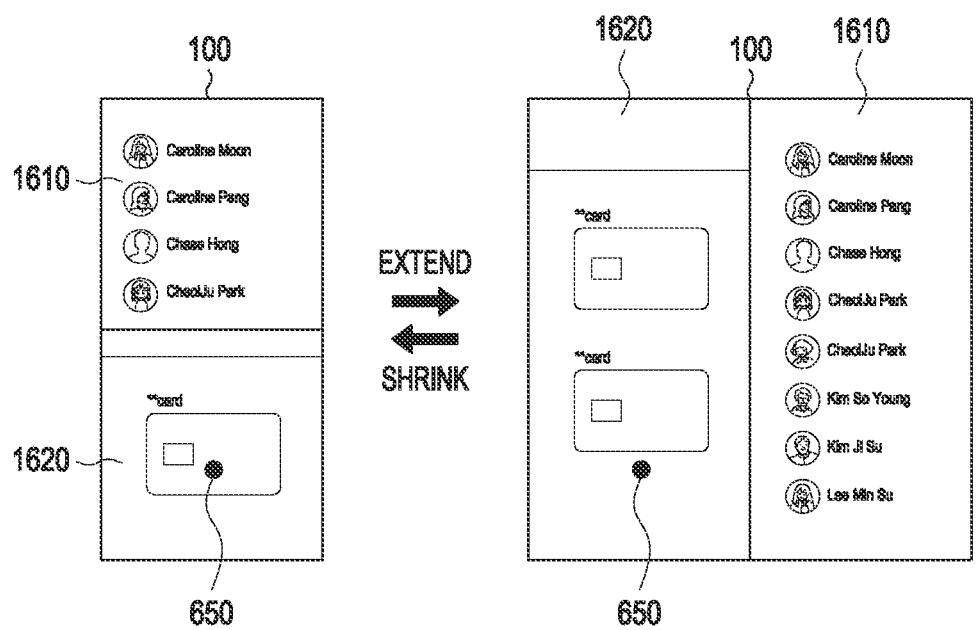
FIGS. 16A and 16B are views illustrating a method for displaying execution screens of a plurality of applications by an electronic device according to various embodiments of the disclosure.
Figure 16B:
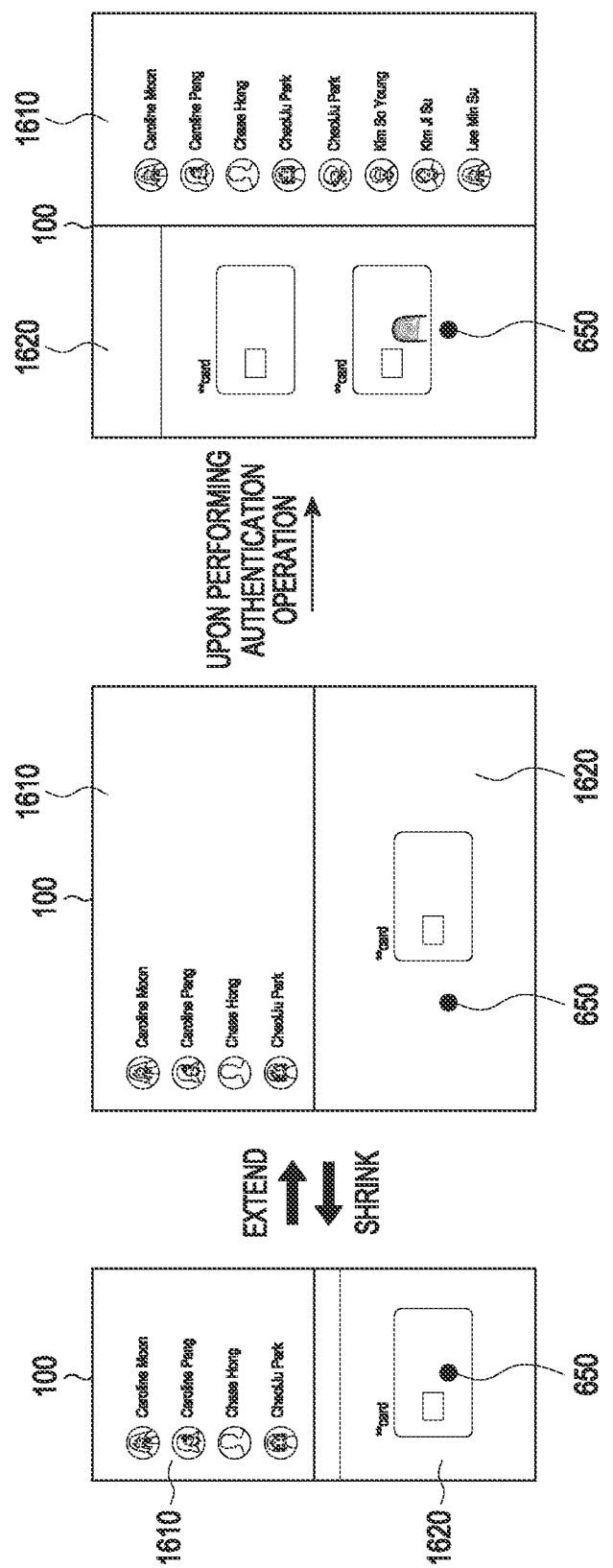

FIGS. 16A and 16B are views illustrating a method for displaying execution screens of a plurality of applications by an electronic device according to various embodiments of the disclosure.

Referring to FIGS. 16A and 16B, the electronic device 100 may display a first execution screen 1610 of a first application and a second execution screen 1620 of a second application. For example, the first application may be an application that does not use the first fingerprint sensor 650, and the second application may be an application (e.g., a payment application) using the first fingerprint sensor 650.

According to various embodiments, referring to FIG. 16A, upon identifying a slide of the flexible display (e.g., the flexible display 103 of FIG. 5), the electronic device 100 may identify the position of the first fingerprint sensor 650. The electronic device 100 may change the screen layout so that the second execution screen 1620 is displayed in the area corresponding to the position of the first fingerprint sensor 650.

According to various embodiments, referring to FIG. 16B, upon identifying a slide of the flexible display (e.g., the flexible display 103 of FIG. 5), the electronic device 100 may identify the position of the first fingerprint sensor 650. Immediately after identifying the position of the fingerprint sensor, the electronic device 100 may not change the screen layout of the first execution screen 1610 and the second execution screen 1620. For example, at the time of using the first fingerprint sensor 650, e.g., when an authentication operation is performed, the electronic device 100 may change the screen layout so that the second execution screen 1620 is displayed in the area corresponding to the position of the first fingerprint sensor 650.

Figure 17:
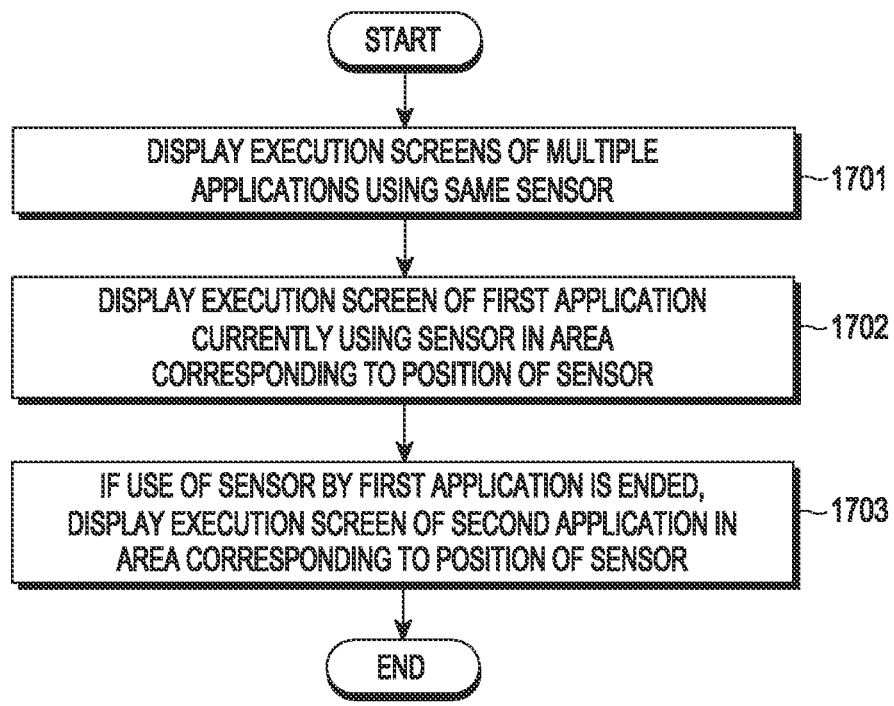
FIG. 17 is a flowchart illustrating a method for displaying execution screens of a plurality of applications using one sensor by an electronic device according to an embodiment of the disclosure.

FIG. 17 is a flowchart illustrating a method for displaying execution screens of a plurality of applications using one sensor by an electronic device according to an embodiment of the disclosure.

Referring to FIG. 17, in operation 1701, the electronic device 100 may display the execution screens of a plurality of applications using the same sensor.

According to various embodiments, in operation 1702, the electronic device 100 may display a first execution screen of a first application currently using the sensor in the area corresponding to the position of the sensor. Alternatively, the electronic device 100 may display the first execution screen of the first application which has first activated the sensor in the area corresponding to the position of the sensor.

According to various embodiments, in operation 1703, if use of the sensor by the first application is ended, the electronic device 100 may display the second execution screen of the second application in the area corresponding to the position of the sensor. For example, the electronic device 100 may change the display positions of the first execution screen and the second execution screen to each other.

Figure 18:
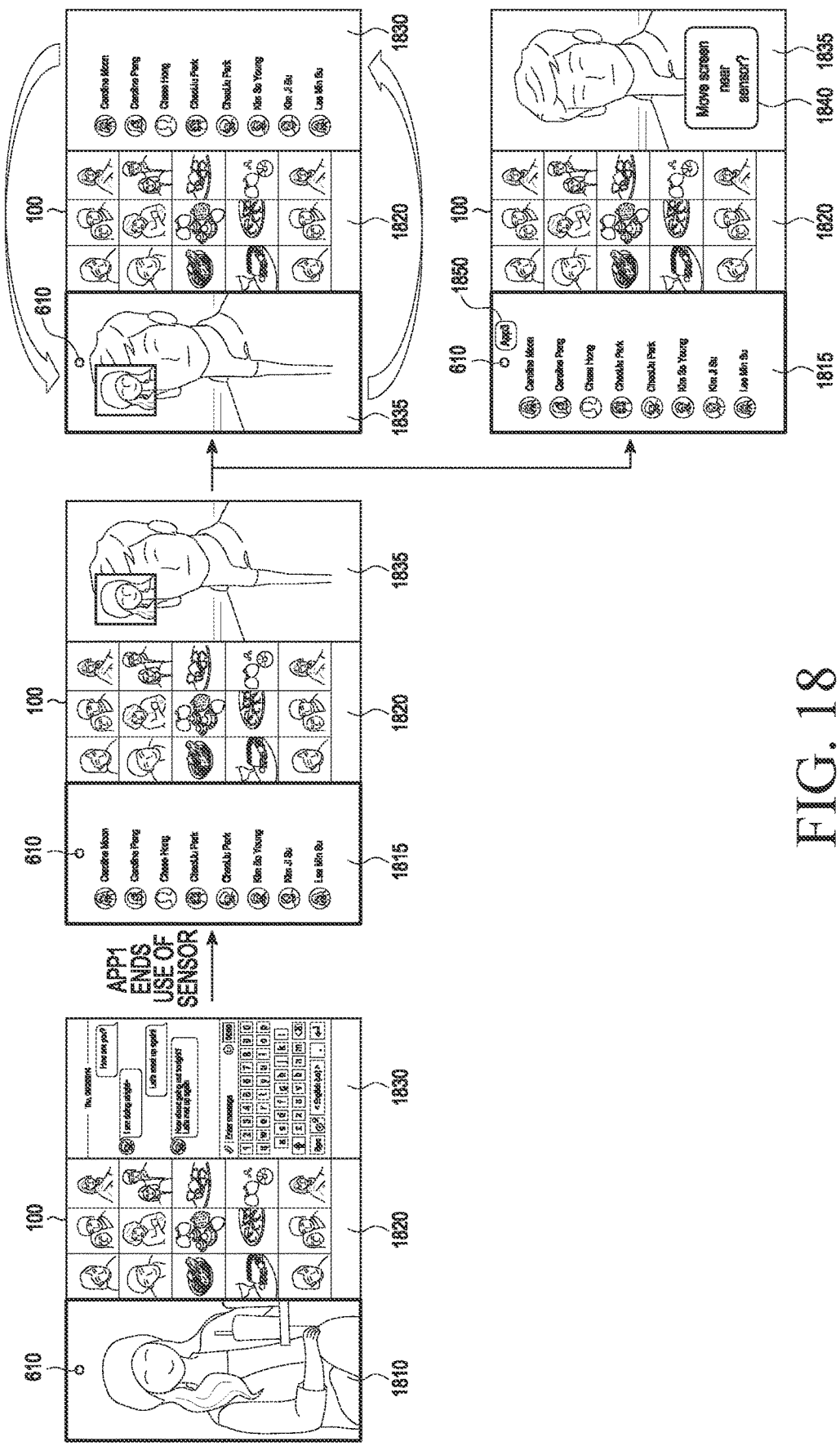
FIG. 18 is a view illustrating a method for displaying execution screens of a plurality of applications using one sensor by an electronic device according to an embodiment of the disclosure.

FIG. 18 is a view illustrating a method for displaying execution screens of a plurality of applications using one sensor by an electronic device according to an embodiment of the disclosure.

Referring to FIG. 18, the electronic device 100 may display a first execution screen 1810 of a first application, a second execution screen 1820 of a second application, and a third execution screen 1830 of a third application. In this case, the first application and the third application may use the same sensor, e.g., the front camera 610.

According to various embodiments, the electronic device 100 may display the first execution screen 1810 of the first application currently using the front camera 610 in the area corresponding to the position of the front camera 610. For example, the first execution screen 1810 may include an image of an object (e.g., the user) captured through the front camera 610.

According to various embodiments, if use of the sensor by the first application is ended, the electronic device 100 may change the first execution screen 1810 into a first screen 1815 where the front camera 610 is inactivated. Further, the electronic device 100 may change the third execution screen 1830 into a third screen 1835 where the front camera 610 is inactivated.

According to various embodiments, the electronic device 100 may automatically change the positions of the first screen 1815 and the third screen 1835 to each other. For example, the electronic device 100 may change the layout of the first screen 1815 and the third screen 1835 so that the third screen is displayed in the area corresponding to the position of the front camera 610.

According to various embodiments, the electronic device 100 may display guide information 1840 for changing the positions of the first screen 1815 and the third screen 1835 to each other. For example, the electronic device 100 may change the positions of the first screen 1815 and the third screen 1835 to each other based on a user input to the guide information 1840. For example, upon identifying a user input indicating acceptance of the screen change, the electronic device 100 may change the layout of the first screen 1815 and the third screen 1835 so that the third screen is displayed in the area corresponding to the position of the front camera 610. Alternatively, unless a user input indicating acceptance of the screen change, the electronic device 100 may change the layout of the first screen 1815 and the third screen 1835. In this case, the electronic device 100 may display a visual object 1850 indicating a third application near the front camera 610. Thus, the user may be aware of the state of using the front camera 610 by the third application.

Figure 19A:
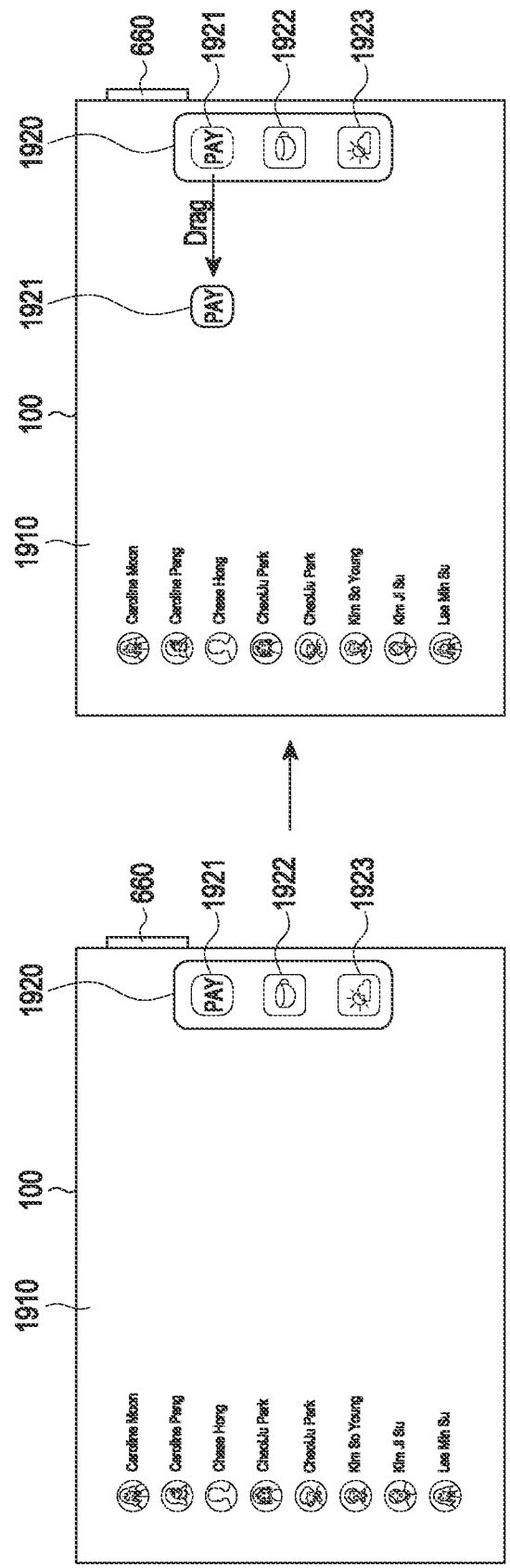
FIGS. 19A, 19B, and 19C are views illustrating a method for displaying execution screens of a plurality of applications by an electronic device according to various embodiments of the disclosure.
Figure 19B:
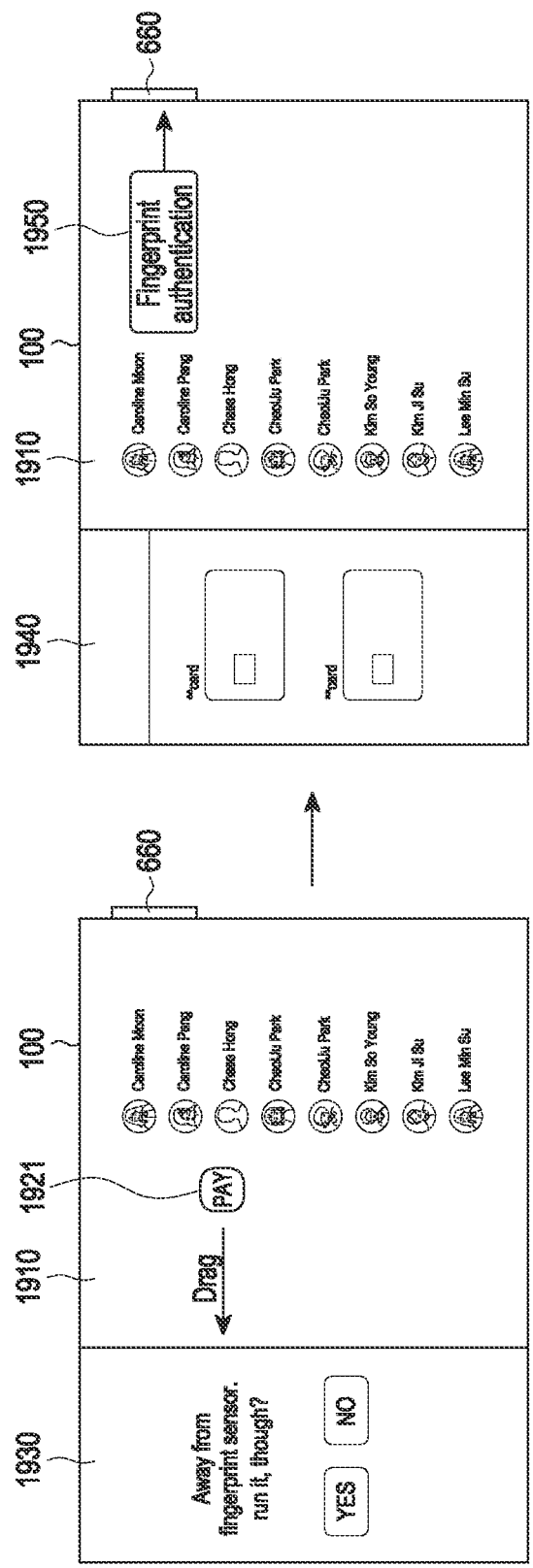
Figure 19C:
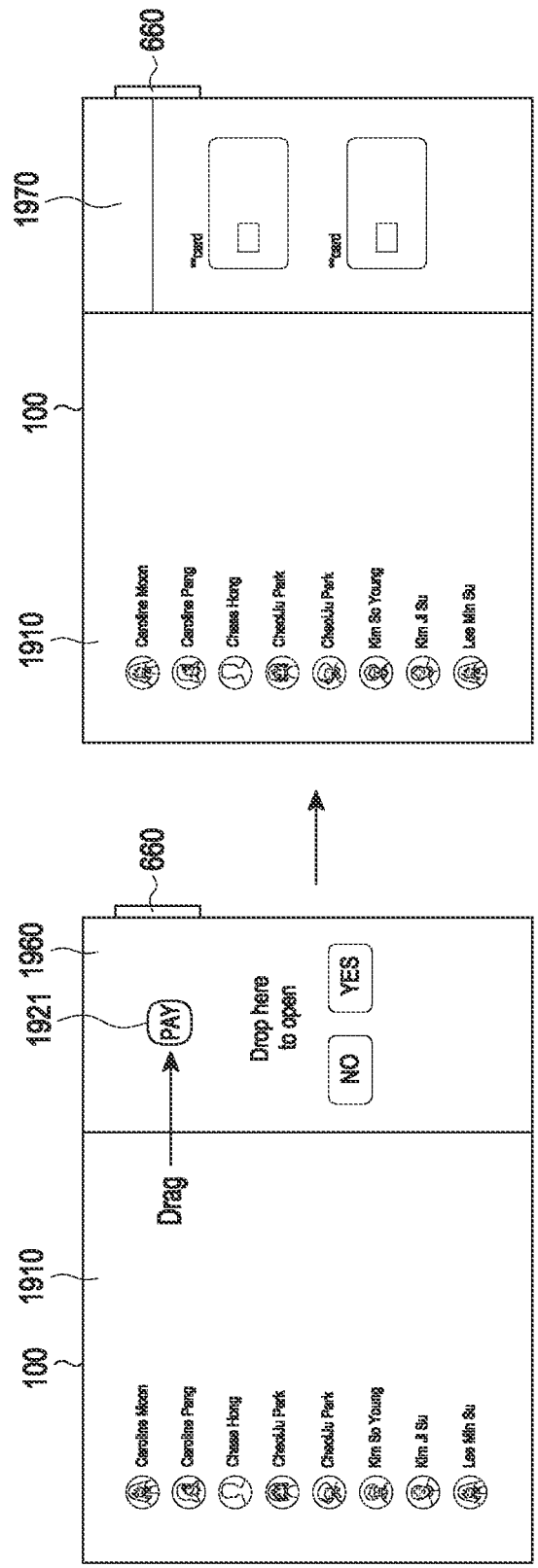

FIGS. 19A, 19B, and 19C are views illustrating a method for displaying execution screens of a plurality of applications by an electronic device according to various embodiments of the disclosure.

Referring to FIG. 19A, the electronic device 100 may display a popup window 1920 to invoke a first screen 1910 and a multi-window. For example, the popup window 1920 may include a plurality of objects 1921, 1922, and 1923 indicating a plurality of applications.

According to various embodiments, the electronic device 100 may drag any one object among the plurality of objects 1921, 1922, and 1923. For example, the electronic device 100 may move a first object 1921 using the second fingerprint sensor 660 based on the user's drag input.

Referring to FIG. 19B, the electronic device 100 may identify the direction of the drag input. For example, when the direction of the drag input does not correspond to the position of the sensor, e.g., the second fingerprint sensor 660, related to the first object 1921 (or when the direction is an opposite direction), the electronic device 100 may display first guide information 1930. The first guide information 1930 may include a message indicating that the position where the execution screen of the application corresponding to the object is to be displayed is away from the position of the related sensor. The electronic device 100 may display a first execution screen 1940 corresponding to the first object 1921 based on a user input to the first guide information 1930. For example, upon identifying an input to accept display of the execution screen of the application, the electronic device 100 may display the first execution screen 1940 corresponding to the first object 1921. If the position where the first execution screen 1940 is displayed is away from the position of the related sensor, e.g., the second fingerprint sensor 660, the electronic device 100 may display a visual object 1950 indicating the position of the second fingerprint sensor 660 in the area corresponding to the position of the fingerprint sensor 600.

Referring to FIG. 19C, the electronic device 100 may identify the direction of the drag input. For example, when the direction of the drag input corresponds to (or adjacent to) the position of the sensor, e.g., the second fingerprint sensor 660, related to the first object 1921, the electronic device 100 may display second guide information 1960. The second guide information 1960 may include a message indicating that the position where the execution screen of the application corresponding to the object is to be displayed is adjacent to the position of the related sensor. Alternatively, the second guide information 1960 may include a message requesting execution of an application. The electronic device 100 may display a first execution screen 1970 corresponding to the first object 1921 based on a user input to the second guide information 1960.

Figure 20A:
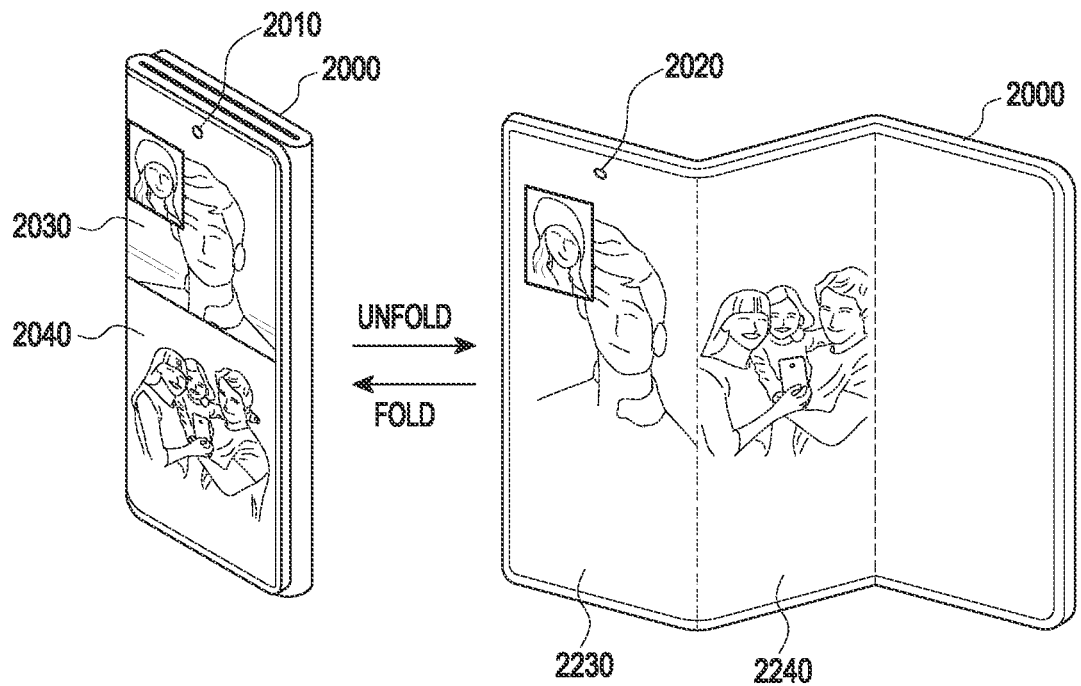
FIGS. 20A and 20B are views illustrating a method for displaying a screen based on a position of a sensor by an electronic device including a flexible display according to various embodiments of the disclosure.
Figure 20B:
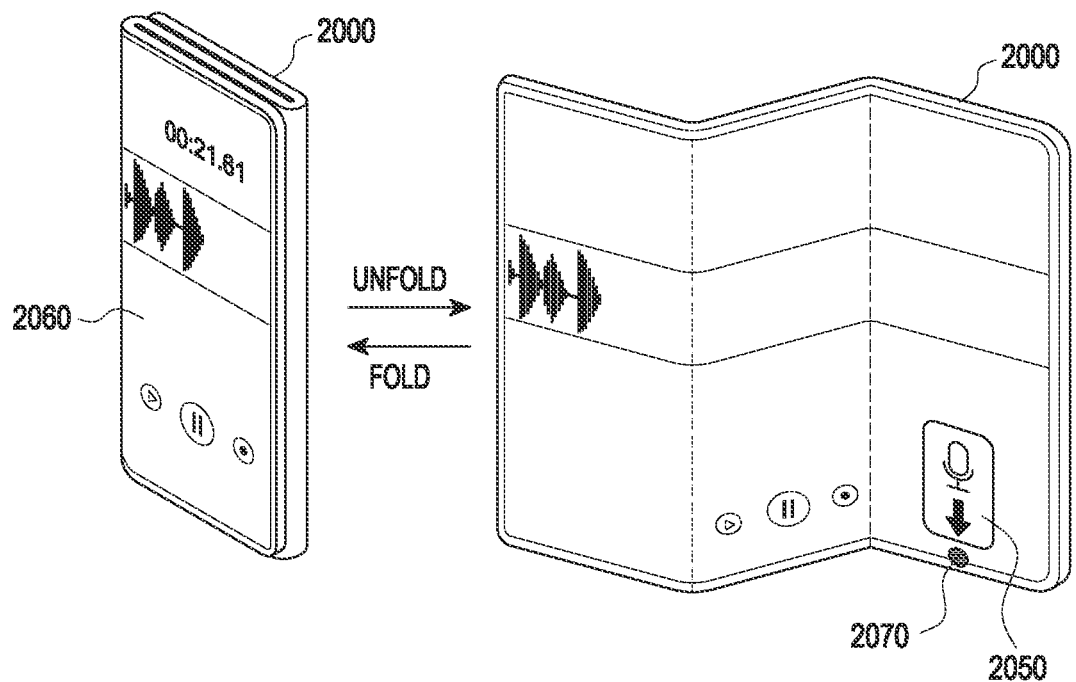

FIGS. 20A and 20B are views illustrating a method for displaying a screen based on a position of a sensor by an electronic device including a flexible display according to various embodiments of the disclosure.

According to various embodiments, referring to FIGS. 20A and 20B, an electronic device 2000 may include a foldable display. The method for determining a screen layout described above in connection with FIGS. 1 to 7, 8A, 8B, 9, 10A, 10B, 11A, 11B, 12 to 14, 15A, 15B, 16A, 16B, 17, 18, and 19A to 19C may apply to the electronic device 2000 of FIGS. 20A and 20B in an identical or similar manner.

According to various embodiments, referring to FIG. 20A, the electronic device 2000 may display a first screen 2030 and a second screen 2040 in a folding state. For example, the first screen 2030 may be an execution screen of an application using a camera. The electronic device 2000 may display the first screen 2030 in an area adjacent to a first camera 2010 disposed on the front surface.

According to various embodiments, if the electronic device 2000 is changed from the folding state to an unfolding state, the electronic device 2000 may display a first screen 2230 and a second screen 2240 on the unfolded flexible display. The electronic device 2000 may determine the display positions of the first screen 2030 and the second screen 2040 so that the first screen is displayed in the area adjacent to a second camera 2020.

According to various embodiments, referring to FIG. 20B, the electronic device 2000 may display a third screen 2060 in the folding state. For example, the third screen 2060 may be an execution screen of an application using a microphone 2070.

According to various embodiments, if the electronic device 2000 is changed from the folding state to the unfolding state, the electronic device 2000 may display the third screen whose screen resolution and screen size are changed on the unfolded flexible display. The electronic device 2000 may display a visual object 2050 indicating the position of the microphone 2070 in the area adjacent to the microphone 2070.

According to various embodiments, referring to FIGS. 20A and 20B, if the electronic device 2000 is changed from the unfolding state to the folding state, the electronic device 2000 may operate in an opposite manner to that of the electronic device 2000 when changing from the folding state to the unfolding state.

The above-described electronic device 100, 100-1, 100-2, or 2000 may be implemented to be identical or similar to the electronic device of FIG. 21 described below.

Figure 21:
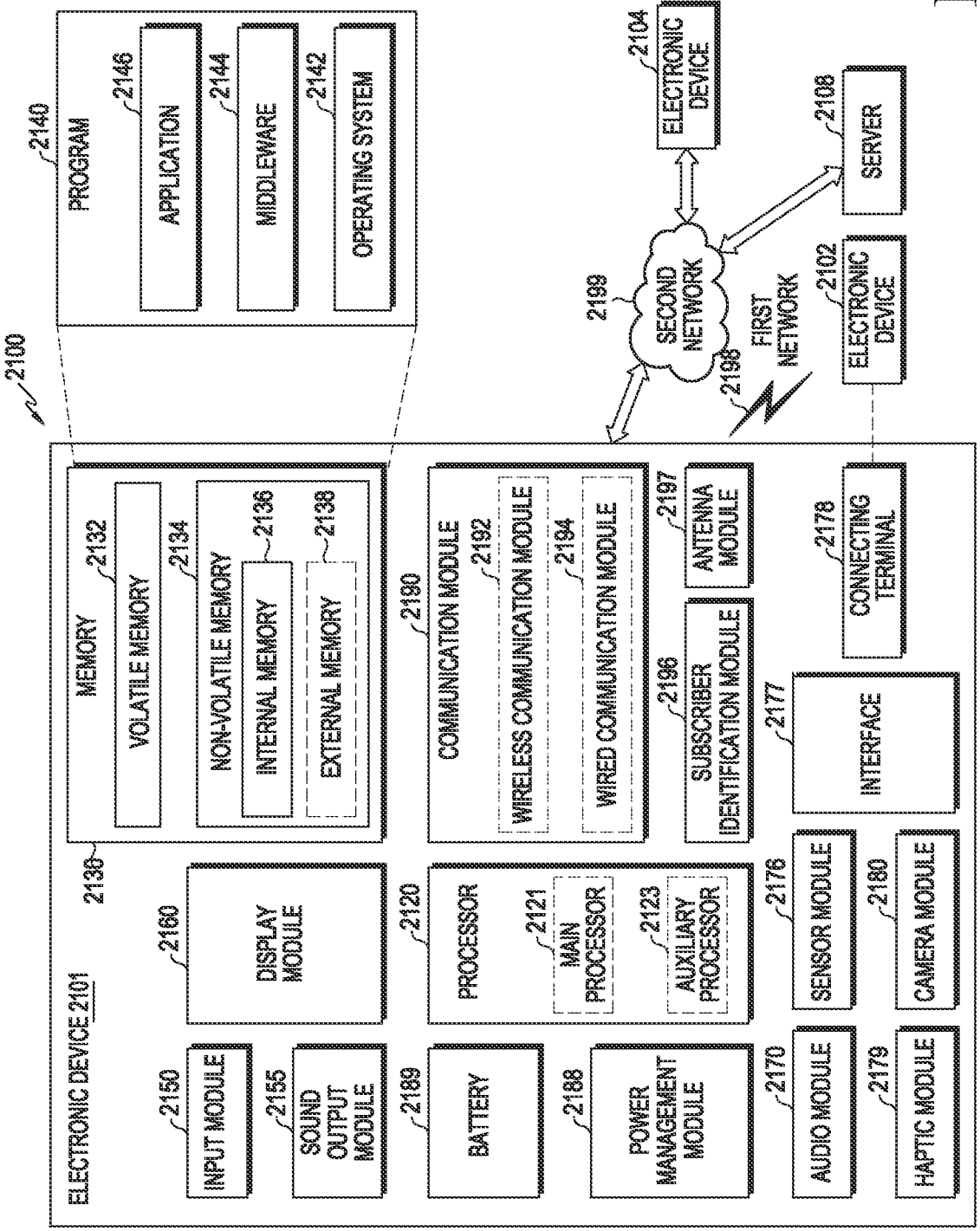
FIG. 21 is a block diagram illustrating an electronic device in a network environment according to an embodiment of the disclosure.

FIG. 21 is a block diagram illustrating an electronic device in a network environment according to an embodiment of the disclosure. Referring to FIG. 21, an electronic device 2101 in a network environment 2100 may communicate with an electronic device 2102 via a first network 2198 (e.g., a short-range wireless communication network), or an electronic device 2104 or a server 2108 via a second network 2199 (e.g., a long-range wireless communication network). According to an embodiment, the electronic device 2101 may communicate with the electronic device 2104 via the server 2108. According to an embodiment, the electronic device 2101 may include a processor 2120, memory 2130, an input module 2150, a sound output module 2155, a display module 2160, an audio module 2170, a sensor module 2176, an interface 2177, a connecting terminal 2178, a haptic module 2179, a camera module 2180, a power management module 2188, a battery 2189, a communication module 2190, a subscriber identification module (SIM) 2196, or an antenna module 2197. In some embodiments, at least one (e.g., the connecting terminal 2178) of the components may be omitted from the electronic device 2101, or one or more other components may be added in the electronic device 2101. According to an embodiment, some (e.g., the sensor module 2176, the camera module 2180, or the antenna module 2197) of the components may be integrated into a single component (e.g., the display module 2160).

The processor 2120 may execute, for example, software (e.g., a program 2140) to control at least one other component (e.g., a hardware or software component) of the electronic device 2101 coupled with the processor 2120, and may perform various data processing or computation. According to one embodiment, as at least part of the data processing or computation, the processor 2120 may store a command or data received from another component (e.g., the sensor module 2176 or the communication module 2190) in volatile memory 2132, process the command or the data stored in the volatile memory 2132, and store resulting data in non-volatile memory 2134. According to an embodiment, the processor 2120 may include a main processor 2121 (e.g., a central processing unit (CPU) or an application processor (AP)), or an auxiliary processor 2123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 2101 includes the main processor 2121 and the auxiliary processor 2123, the auxiliary processor 2123 may be configured to use lower power than the main processor 2121 or to be specified for a designated function. The auxiliary processor 2123 may be implemented as separate from, or as part of the main processor 2121.

The auxiliary processor 2123 may control at least some of functions or states related to at least one component (e.g., the display module 2160, the sensor module 2176, or the communication module 2190) among the components of the electronic device 2101, instead of the main processor 2121 while the main processor 2121 is in an inactive (e.g., sleep) state, or together with the main processor 2121 while the main processor 2121 is in an active state (e.g., executing an application). According to an embodiment, the auxiliary processor 2123 (e.g., an image signal processor or a communication processor) may be implemented as part of another component (e.g., the camera module 2180 or the communication module 2190) functionally related to the auxiliary processor 123. According to an embodiment, the auxiliary processor 2123 (e.g., the neural processing unit) may include a hardware structure specified for artificial intelligence model processing. The artificial intelligence model may be generated via machine learning. Such learning may be performed, e.g., by the electronic device 2101 where the artificial intelligence is performed or via a separate server (e.g., the server 2108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2130 may store various data used by at least one component (e.g., the processor 2120 or the sensor module 2176) of the electronic device 2101. The various data may include, for example, software (e.g., the program 2140) and input data or output data for a command related thereto. The memory 2130 may include the volatile memory 2132 or the non-volatile memory 2134. The non-volatile memory may include at least one of an internal memory 2136 and an external memory 2138.

The program 2140 may be stored in the memory 2130 as software, and may include, for example, an operating system (OS) 2142, middleware 2144, or an application 2146.

The input module 2150 may receive a command or data to be used by another component (e.g., the processor 2120) of the electronic device 2101, from the outside (e.g., a user) of the electronic device 2101. The input module 2150 may include, for example, a microphone, a mouse, a keyboard, keys (e.g., buttons), or a digital pen (e.g., a stylus pen).

The sound output module 2155 may output sound signals to the outside of the electronic device 2101. The sound output module 2155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 2160 may visually provide information to the outside (e.g., a user) of the electronic device 2101. The display module 2160 may include, for example, a display, a hologram device, or a projector and control circuitry to control a corresponding one of the display, hologram device, and projector. According to an embodiment, the display module 2160 may include a touch sensor configured to detect a touch, or a pressure sensor configured to measure the intensity of a force generated by the touch.

The audio module 2170 may convert a sound into an electrical signal and vice versa. According to an embodiment, the audio module 2170 may obtain the sound via the input module 2150, or output the sound via the sound output module 2155 or a headphone of an external electronic device (e.g., the electronic device 2102) directly (e.g., wiredly) or wirelessly coupled with the electronic device 2101.

The sensor module 2176 may detect an operational state (e.g., power or temperature) of the electronic device 2101 or an environmental state (e.g., a state of a user) external to the electronic device 2101, and then generate an electrical signal or data value corresponding to the detected state. According to an embodiment, the sensor module 2176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 2177 may support one or more specified protocols to be used for the electronic device 2101 to be coupled with the external electronic device (e.g., the electronic device 2102) directly (e.g., wiredly) or wirelessly. According to an embodiment, the interface 2177 may include, for example, a high definition multimedia interface (HDMI), a universal serial bus (USB) interface, a secure digital (SD) card interface, or an audio interface.

A connecting terminal 2178 may include a connector via which the electronic device 2101 may be physically connected with the external electronic device (e.g., the electronic device 2102). According to an embodiment, the connecting terminal 2178 may include, for example, a HDMI connector, a USB connector, an SD card connector, or an audio connector (e.g., a headphone connector).

The haptic module 2179 may convert an electrical signal into a mechanical stimulus (e.g., a vibration or motion) or electrical stimulus which may be recognized by a user via his tactile sensation or kinesthetic sensation. According to an embodiment, the haptic module 2179 may include, for example, a motor, a piezoelectric element, or an electric stimulator.

The camera module 2180 may capture a still image or moving images. According to an embodiment, the camera module 2180 may include one or more lenses, image sensors, image signal processors, or flashes.

The power management module 2188 may manage power supplied to the electronic device 2101. According to one embodiment, the power management module 2188 may be implemented as at least part of, for example, a power management integrated circuit (PMIC).

The battery 2189 may supply power to at least one component of the electronic device 2101. According to an embodiment, the battery 2189 may include, for example, a primary cell which is not rechargeable, a secondary cell which is rechargeable, or a fuel cell.

The communication module 2190 may support establishing a direct (e.g., wired) communication channel or a wireless communication channel between the electronic device 2101 and the external electronic device (e.g., the electronic device 2102, the electronic device 2104, or the server 2108) and performing communication via the established communication channel. The communication module 2190 may include one or more communication processors that are operable independently from the processor 2120 (e.g., the application processor (AP)) and supports a direct (e.g., wired) communication or a wireless communication. According to an embodiment, the communication module 2190 may include a wireless communication module 2192 (e.g., a cellular communication module, a short-range wireless communication module, or a global navigation satellite system (GNSS) communication module) or a wired communication module 2194 (e.g., a local area network (LAN) communication module or a power line communication (PLC) module). A corresponding one of these communication modules may communicate with the external electronic device 2104 via the first network 2198 (e.g., a short-range communication network, such as Bluetooth™, wireless-fidelity (Wi-Fi) direct, or infrared data association (IrDA)) or the second network 2199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 2192 may identify or authenticate the electronic device 2101 in a communication network, such as the first network 2198 or the second network 2199, using subscriber information (e.g., international mobile subscriber identity (IMSI)) stored in the subscriber identification module 2196.

The wireless communication module 2192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2192 may support a high-frequency band (e.g., the millimeter wave (mmWave) band) to achieve, e.g., a high data transmission rate. The wireless communication module 2192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2192 may support various requirements specified in the electronic device 2101, an external electronic device (e.g., the electronic device 2104), or a network system (e.g., the second network 2199). According to an embodiment, the wireless communication module 2192 may support a peak data rate (e.g., 20 gigabit(s) per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2197 may transmit or receive a signal or power to or from the outside (e.g., the external electronic device). According to an embodiment, the antenna module 2197 may include one antenna including a radiator formed of a conductive body or conductive pattern formed on a substrate (e.g., a printed circuit board (PCB)). According to an embodiment, the antenna module 2197 may include a plurality of antennas (e.g., an antenna array). In this case, at least one antenna appropriate for a communication scheme used in a communication network, such as the first network 2198 or the second network 2199, may be selected from the plurality of antennas by, e.g., the communication module 2190. The signal or the power may then be transmitted or received between the communication module 2190 and the external electronic device via the selected at least one antenna. According to an embodiment, other parts (e.g., radio frequency integrated circuit (RFIC)) than the radiator may be further formed as part of the antenna module 2197.

According to various embodiments, the antenna module 2197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2101 and the external electronic device 2104 via the server 2108 coupled with the second network 2199. The external electronic devices 2102 or 2104 each may be a device of the same or a different type from the electronic device 2101. According to an embodiment, all or some of operations to be executed at the electronic device 2101 may be executed at one or more of the external electronic devices 2102 and 2104 or the server 2108. For example, if the electronic device 2101 should perform a function or a service automatically, or in response to a request from a user or another device, the electronic device 2101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2101. The electronic device 2101 may provide the outcome, with or without further processing of the outcome, as at least part of a reply to the request. To that end, a cloud computing, distributed computing, mobile edge computing (MEC), or client-server computing technology may be used, for example. The electronic device 2101 may provide ultra low-latency services using, e.g., distributed computing or mobile edge computing. In another embodiment, the external electronic device 2104 may include an Internet-of-things (IoT) device. The server 2108 may be an intelligent server using machine learning and/or a neural network. According to an embodiment, the external electronic device 2104 or the server 2108 may be included in the second network 2199. The electronic device 2101 may be applied to intelligent services (e.g., smart home, smart city, smart car, or healthcare) based on 5G communication technology or IoT-related technology.

As described above, according to various embodiments, an electronic device may comprise a housing, a flexible display at least partially exposed to an outside through the housing and slidable through the housing, a plurality of sensors including at least one first sensor whose position is changed according to a slide of the flexible display and at least one second sensor whose position is not changed regardless of a slide of the flexible display, and a processor disposed in the housing and configured to, when a first function using the at least one first sensor is performed, display a first screen for the first function in a first area of the flexible display, identify a position of the at least one first sensor based on the slide of the flexible display, and display the first screen in a second area corresponding to the position of the first sensor.

The processor may be configured to identify the position of the at least one first sensor, changed according to the slide of the flexible display, based on pre-stored position information about the at least one first sensor.

The processor may be configured to, when the flexible display slides, display guide information for changing a display position of the first screen and change the first screen from the first area to the second area based on a user input to the guide information.

The processor may be configured to, when the first screen and at least one screen related to a function different from the first function are together displayed on the flexible display, arrange the first screen and the at least one screen so that the first screen is displayed in the second area corresponding to the position of the at least one first sensor based on the slide of the flexible display.

The processor may be configured to, when a second function using the at least one second sensor is performed, display a second screen for the second function on the flexible display and display a visual object related to the second function in a third area corresponding to the position of the at least one second sensor based on the slide of the flexible display.

The processor may be configured to, when the first screen related to the first function and a second screen related to a second function using the at least one second sensor are together displayed on the flexible display, identify the slide of the flexible display and arrange the first screen and the second screen so that the first screen is displayed in the second area corresponding to the position of the at least one first sensor and the second screen is displayed in a third area corresponding to the position of the at least one second sensor, based on the slide of the flexible display.

The processor may be configured to identify the slide of the flexible display when execution screens of a plurality of applications using the at least one first sensor are together displayed on the flexible display and display a first execution screen of a first application currently using the at least one sensor, among the plurality of applications, in an area corresponding to the position of the at least one first sensor based on the slide of the flexible display.

The processor may be configured to display a visual object related to the first application on the flexible display.

The processor may be configured to, when the first application terminates use of the at least one first sensor, display a second execution screen of a second application, among the plurality of applications, in the area corresponding to the position of the at least one first sensor.

The processor may be configured to display a third screen in an unfolded state of the flexible display, identify a sensor related to a specific application among the plurality of sensors in response to a drag input for displaying an execution screen of the specific application along with the third screen, identify a position where the execution screen of the specific application is to be displayed based on the drag input and compare the position where the execution screen is to be displayed with a position of the sensor, and provide a guide related to display of the execution screen according to a result of the comparison.

The processor may be configured to display a visual object indicating the position of the sensor if the position where the execution screen is displayed does not correspond to the position of the sensor.

The processor may be configured to display an execution screen of an application using the plurality of sensors in an area corresponding to a position of any one of the plurality of sensors and display a visual object indicating the position of the sensor in an area corresponding to a position of another one of the plurality of sensors.

The processor may be configured to display the first screen in the second area through a popup window.

According to various embodiments, a method for operating an electronic device including a flexible display may comprise, when a first function using the at least one first sensor is performed, displaying a first screen for the first function in a first area of a slidable flexible display included in the electronic device, identifying a slide of the flexible display, identifying a position of the at least one first sensor based on the slide of the flexible display, and displaying the first screen in a second area corresponding to the position of the at least one first sensor among a plurality of sensors included in the electronic device. The plurality of sensors may include the at least one first sensor whose position is changed according to a slide of the flexible display and at least one second sensor whose position is not changed regardless of a slide of the flexible display.

Displaying the first screen in the second area may include, when the flexible display slides, displaying guide information for changing a display position of the first screen and changing the first screen from the first area to the second area based on a user input to the guide information.

Displaying the first screen in the second area may include, when the first screen and at least one screen related to a function different from the first function are together displayed on the flexible display, identifying the slide of the flexible display and arranging the first screen and the at least one screen so that the first screen is displayed in the second area corresponding to the position of the at least one first sensor based on the slide of the flexible display.

The method for operating the electronic device may further comprise, when a second function using the at least one second sensor is performed, displaying a second screen for the second function on the flexible display and displaying a visual object related to the second function in a third area corresponding to the position of the at least one second sensor based on the slide of the flexible display.

Displaying the first screen in the second area may include, when the first screen related to the first function and a second screen related to a second function using the at least one second sensor are together displayed on the flexible display, identifying the slide of the flexible display and arranging the first screen and the second screen so that the first screen is displayed in the second area corresponding to the position of the at least one first sensor and the second screen is displayed in a third area corresponding to the position of the at least one second sensor, based on the slide of the flexible display.

The method for operating the electronic device may further comprise displaying a third screen in an unfolded state of the flexible display, identifying a sensor related to a specific application among the plurality of sensors in response to a drag input for displaying an execution screen of the specific application along with the third screen, identifying a position where the execution screen of the specific application is to be displayed based on the drag input and comparing the position where the execution screen is to be displayed with a position of the sensor, and providing a guide related to display of the execution screen according to a result of the comparison.

The method for operating the electronic device may further comprise displaying an execution screen of an application using the plurality of sensors in an area corresponding to a position of any one of the plurality of sensors and displaying a visual object indicating the position of the sensor in an area corresponding to a position of another one of the plurality of sensors.

According to various embodiments, a computer-readable non-volatile recording medium may store instructions that, when executed by a processor of an electronic device, allow the processor to, when a first function using the at least one first sensor is performed, display a first screen for the first function in a first area of a slidable flexible display included in the electronic device, identify a slide of the flexible display, identify a position of the at least one first sensor based on the slide of the flexible display, and display the first screen in a second area corresponding to the position of the at least one first sensor among a plurality of sensors included in the electronic device. The plurality of sensors may include the at least one first sensor whose position is changed according to a slide of the flexible display and at least one second sensor whose position is not changed regardless of a slide of the flexible display.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   memory storing one or more computer programs;
   a first structure and a second structure movable with respect to the first structure;
   a flexible display coupled to the first structure and the second structure;
   a plurality of sensors including a first sensor disposed in the first structure and at least one second sensor; and
   one or more processors,
   wherein the one or more computer programs include computer-executable instructions that, when executed by the one or more processors, cause the electronic device to:
     in response to a first function using the first sensor being performed while the first sensor is at a first position in relation to the flexible display, display a first screen related to the first function in a first area of the flexible display,
     identify a moving of the second structure with respect to the first structure,
     based on the moving, identify a second position of the first sensor in relation to the flexible display, and
     display an object indicating the second position of the first sensor in relation to the flexible display, and
   wherein the object indicates a type of the first sensor among the plurality of sensors and a location of the second position of the first sensor.

2. The electronic device of claim 1, wherein the one or more computer programs further include computer-executable instructions that, when executed by the one or more processors, cause the electronic device to:
   based on pre-stored position information about the first sensor, identify the second position of the first sensor in relation to the flexible display after the first sensor changes its position from the first position to the second position according to the moving.

3. The electronic device of claim 1, wherein the one or more computer programs further include computer-executable instructions that, when executed by the one or more processors, cause the electronic device to:
   in response to the moving, display guide information for moving a display position of the first screen, and
   based on a user input to the guide information, move the first screen from the first area to a second area corresponding to the second position of the first sensor.

4. The electronic device of claim 1, wherein the one or more computer programs further include computer-executable instructions that, when executed by the one or more processors, cause the electronic device to:
   while the first screen and at least one screen related to a function different from the first function are being displayed together on the flexible display, arrange the first screen and the at least one screen so that the first screen is displayed in a second area corresponding to the second position of the first sensor based on the moving.

5. The electronic device of claim 1, wherein the one or more computer programs further include computer-executable instructions that, when executed by the one or more processors, cause the electronic device to:
in response to a second function using a second sensor disposed in the second structure being performed, display a second screen related to the second function on the flexible display, and
based on the moving, display a visual object related to the second function in a third area corresponding to a position of the second sensor.

6. The electronic device of claim 1, wherein the one or more computer programs further include computer-executable instructions that, when executed by the one or more processors, cause the electronic device to:
while the first screen related to the first function and a second screen related to a second function using a second sensor disposed in the second structure are displayed together on the flexible display, identify the moving, and
based on the moving, arrange the first screen and the second screen so that the first screen is displayed in a second area corresponding to the second position of the first sensor and the second screen is displayed in a third area corresponding to a position of the second sensor.

7. The electronic device of claim 1, wherein the one or more computer programs further include computer-executable instructions that, when executed by the one or more processors, cause the electronic device to:
while execution screens of a plurality of applications using the first sensor are being displayed together on the flexible display, identify the moving; and
based on the moving, display a first execution screen of a first application currently using the first sensor, among the plurality of applications, in an area corresponding to the second position of the first sensor.

8. The electronic device of claim 7, wherein the one or more computer programs further include computer-executable instructions that, when executed by the one or more processors, cause the electronic device to:
display, on the flexible display, a visual object related to the first application near the first sensor.

9. The electronic device of claim 7, wherein the one or more computer programs further include computer-executable instructions that, when executed by the one or more processors, cause the electronic device to:
in response to the first application terminating use of the first sensor, display a second execution screen of a second application, among the plurality of applications, in the area corresponding to the second position of the first sensor.

10. The electronic device of claim 1, wherein the one or more computer programs further include computer-executable instructions that, when executed by the one or more processors, cause the electronic device to:
display a third screen in an unfolded state of the flexible display,
in response to a drag input for displaying an execution screen of a specific application together with the third screen, identify a sensor related to the specific application among the plurality of sensors,
based on the drag input, identify a position where the execution screen of the specific application is to be displayed and compare the position where the execution screen is to be displayed with a position of the sensor, and provide a guide related to the displaying of the execution screen according to a result of the comparing.

11. The electronic device of claim 10, wherein the one or more computer programs further include computer-executable instructions that, when executed by the one or more processors, cause the electronic device to:
in response to the position where the execution screen is to be displayed not corresponding to the position of the sensor, display the object indicating the position of the sensor.

12. The electronic device of claim 1, wherein the one or more computer programs further include computer-executable instructions that, when executed by the one or more processors, cause the electronic device to:
display the first screen in a second area corresponding to the second position of the first sensor through a popup window.

13. The electronic device of claim 1,
wherein the object includes a shape object having a shape corresponding to the first sensor and an indicator object having an arrow type indicator pointing to the location of the second position of the first sensor, and
wherein the first sensor includes a camera, a fingerprint sensor, a microphone, a speaker, or near field communication (NFC) circuitry.

14. A method performed by an electronic device including a plurality of sensors, a first structure, and a second structure movable with respect to the first structure, the method comprising:
in response to performing a first function using a first sensor included in electronic device while the first sensor is at a first position in relation to a flexible display of the electronic device, displaying, by the electronic device, a first screen related to the first function in a first area of the flexible display, wherein the flexible display is coupled to the first structure and the second structure;
identifying, by the electronic device, a moving of the second structure with respect to the first structure;
based on the moving, identifying, by the electronic device, a second position of the first sensor in relation to the flexible display; and
displaying, by the electronic device, an object indicating the second position of the first sensor among the plurality of sensors,
wherein the plurality of sensors include the first sensor disposed in the first structure and at least one second sensor, and
wherein the object indicates a type of the first sensor among the plurality of sensors and a location of the second position of the first sensor.

15. The method of claim 14, further comprising:
in response to the moving, displaying, by the electronic device, guide information for changing a display position of the first screen; and
based on a user input to the guide information, moving, by the electronic device, the first screen from the first area to a second area.

16. The method of claim 15, wherein the guide information comprises a message notifying a user of the moving of the display position of the first screen to an area where the first sensor is positioned.

17. The method of claim 15, further comprising:
refraining, by the electronic device, from moving the display position of the first screen until the user input to the guide information is identified.

18. The method of claim 15, further comprising:

based on the user input not being identified, changing, by the electronic device, a layout of the first screen and at least one second screen related to a function different from the first function and displaying, by the electronic device, a visual object indicating an application near the first sensor.

19. The method of claim 14, further comprising:

while the first screen and at least one screen related to a function different from the first function are being displayed together on the flexible display, identifying, by the electronic device, the moving; and based on the moving, arranging, by the electronic device, the first screen and the at least one screen so that the first screen is displayed in a second area corresponding to the second position of the first sensor.

20. The method of claim 14, further comprising:

in response to the identifying of the moving, identifying, by the electronic device, the second position of the first sensor related to an application currently running or whose execution screen is displayed on the flexible display by identifying coordinate information about the first sensor based on pre-stored sensor position information and a moving distance of the flexible display.

* * * * *